(12) United States Patent
Abe et al.

(10) Patent No.: US 9,511,623 B2
(45) Date of Patent: Dec. 6, 2016

(54) VEHICLE WHEEL DISK AND A MANUFACTURING METHOD THEREOF

(71) Applicant: TOPY KOGYO KABUSHIKI KAISHA, Tokyo (JP)

(72) Inventors: Kishiro Abe, Ayase (JP); Ryo Nishibayashi, Ayase (JP); Takamitsu Takano, Ayase (JP); Kazunari Sano, Yamato (JP); Yuta Isomura, Toyokawa (JP)

(73) Assignee: TOPY KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/378,225

(22) PCT Filed: Mar. 11, 2013

(86) PCT No.: PCT/JP2013/056588
§ 371 (c)(1),
(2) Date: Aug. 12, 2014

(87) PCT Pub. No.: WO2013/137168
PCT Pub. Date: Sep. 19, 2013

(65) Prior Publication Data
US 2015/0001913 A1    Jan. 1, 2015

(30) Foreign Application Priority Data

Mar. 12, 2012  (JP) .................................. 2012-053940
May 28, 2012  (JP) ................................. 2012-120571
Oct. 9, 2012  (JP) ................................. 2012-223818

(51) Int. Cl.
*B60B 3/00* (2006.01)
*B60B 3/04* (2006.01)
(Continued)

(52) U.S. Cl.
CPC ............... *B60B 3/004* (2013.01); *B21D 19/08* (2013.01); *B21D 22/02* (2013.01); *B21D 35/006* (2013.01);
(Continued)

(58) Field of Classification Search
CPC ............ B60B 3/04; B60B 3/007; B60B 3/002; B60B 3/005
(Continued)

(56) References Cited

U.S. PATENT DOCUMENTS 1,650,780 A * 11/1927 Williams ................. B21K 1/34
                                            301/63.108
2,088,992 A *  8/1937 Bierwirth ............. B21D 53/265
                                            29/894.325
(Continued)

FOREIGN PATENT DOCUMENTS

CN         201989552 U     9/2011
DE           2647464 A1    4/1978
(Continued)

*Primary Examiner* — Hau Phan
(74) *Attorney, Agent, or Firm* — Andrews Kurth Kenyon LLP

(57) ABSTRACT

A vehicle wheel disk and a manufacturing method thereof is provided. The vehicle wheel disk is manufactured from a disk material of a flat plate. The vehicle wheel disk includes a hub coupling portion, a disk flange and a hat. The hat includes a hat top protruding outwardly in an axial direction of the disk, a radially inner hat portion connecting the hat top and the hub coupling portion, and a radially outer hat portion connecting the hat top and the disk flange. In the vehicle wheel disk, a first thickness-reduced portion is smaller in thickness than the disk material that is formed at the radially outer hat portion.

7 Claims, 22 Drawing Sheets

(51) Int. Cl.
  *B21D 19/08* (2006.01)
  *B21D 22/02* (2006.01)
  *B21D 35/00* (2006.01)
  *B21D 53/30* (2006.01)
  *B60B 3/02* (2006.01)

(52) U.S. Cl.
  CPC .............. *B21D 53/30* (2013.01); *B60B 3/005* (2013.01); *B60B 3/02* (2013.01); *B60B 3/04* (2013.01); *B60B 3/044* (2013.01); *B60B 3/045* (2013.01); *B60B 2310/212* (2013.01); *B60B 2900/111* (2013.01); *B60B 2900/212* (2013.01); *B60B 2900/311* (2013.01); *B60Y 2200/10* (2013.01); *B60Y 2200/14* (2013.01); *Y10T 29/49504* (2015.01)

(58) Field of Classification Search
  USPC .......................... 301/63.101, 63.108, 63.104
  See application file for complete search history.

(56) References Cited

U.S. PATENT DOCUMENTS

| | | | | |
|---|---|---|---|---|
| 2,406,062 A * | 8/1946 | Cornell | ............... | B21D 53/265 |
| | | | | 301/63.108 |
| 3,627,382 A * | 12/1971 | Lejeune | ................... | B60B 3/04 |
| | | | | 301/63.108 |
| 4,106,172 A * | 8/1978 | Bache | .................. | B21D 53/26 |
| | | | | 301/63.104 |
| 5,577,810 A * | 11/1996 | Abe | ....................... | B21D 53/26 |
| | | | | 301/63.105 |
| 5,951,114 A * | 9/1999 | Marron | ................ | B21D 53/265 |
| | | | | 301/63.101 |
| 6,332,653 B1 | 12/2001 | Shimizu et al. | | |
| 6,439,282 B1 | 8/2002 | Kimura et al. | | |
| 7,922,260 B2 * | 4/2011 | Rodrigues | ................ | B60B 3/002 |
| | | | | 301/63.101 |
| 8,042,880 B2 * | 10/2011 | Kozaki | .................. | B60B 3/005 |
| | | | | 301/63.101 |
| 8,050,986 B2 * | 11/2011 | Moeller | ................... | G06N 7/00 |
| | | | | 705/26.5 |
| 8,770,671 B2 * | 7/2014 | Nyunoya | ............... | B60B 3/007 |
| | | | | 301/63.101 |
| 9,050,853 B2 * | 6/2015 | Kataoka | .................. | B60B 3/007 |
| 9,139,039 B2 * | 9/2015 | Kozaki | .................. | B60B 3/005 |
| 2002/0007556 A1 | 1/2002 | Marron et al. | | |

FOREIGN PATENT DOCUMENTS

| | | |
|---|---|---|
| DE | 19548109 A1 | 6/1997 |
| DE | 29915636 U1 | 12/1999 |
| DE | 29912453 U1 | 11/2000 |
| DE | 602004006217 T2 | 12/2007 |
| DE | 102008051601 A1 | 6/2010 |
| EP | 0780244 A2 | 6/1997 |
| EP | 1541376 A1 | 6/2005 |
| EP | 2327565 A1 | 6/2011 |
| JP | H11-227401 A | 8/1999 |
| JP | 2000-085302 A | 3/2000 |
| JP | 2000-142002 A | 5/2000 |
| JP | 2000-176580 A | 6/2000 |
| JP | 2001-058501 A | 3/2001 |
| JP | 2002-45939 A | 2/2002 |
| JP | 2004-26017 A | 1/2004 |
| JP | 2005-074500 A | 3/2005 |
| JP | 2007-083297 A | 4/2007 |

* cited by examiner

FIG. 18
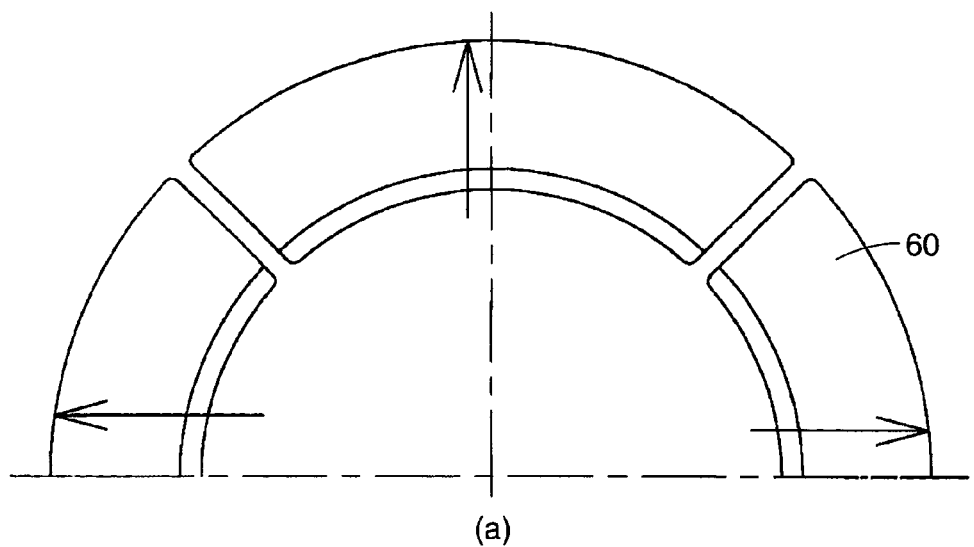
(a)
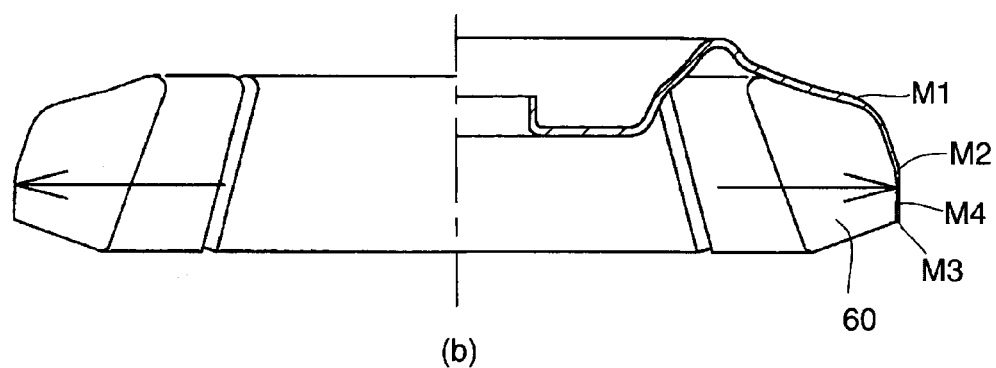
(b)

VEHICLE WHEEL DISK AND A MANUFACTURING METHOD THEREOF

CROSS-REFERENCE TO RELATED APPLICATIONS

This is a national phase application based on the PCT International Patent Application No. PCT/JP2013/056588 filed Mar. 11, 2013, claiming priority to Japanese patent application Nos. 2012-053940 filed Mar. 2, 2012, 2012-120571 filed May 28, 2012 and 2012-223818 filed Oct. 9, 2012, the entire contents of all of which are incorporated herein by reference.

TECHNICAL FIELD

The present invention relates to a vehicle wheel disk including a hat, for a single-mounted type wheel used for a passenger car, etc., and a manufacturing method thereof. More particularly, the present invention relates to a vehicle wheel disk manufactured from a disk material of a flat plate and a manufacturing method thereof.

BACKGROUND

Patent Documents 1 and 2 disclose a manufacturing method of a vehicle wheel disk manufactured from a disk material of a flat plate, for a single-mounted type wheel (including a disk having a hat and used for a passenger car, etc.)

Patent Documents 1 and 2 disclose a manufacturing method of a vehicle wheel disk where a disk flange is reduced in thickness by ironing the disk flange.

However, there are the following problems with the conventional manufacturing method of a vehicle wheel disk:

In the manufacturing method disclosed in Patent Documents 1 and 2, only the disk flange is reduced in thickness by ironing. The disk flange is substantially constant in diameter, extends parallel to an axis of the disk, and is limited in length. Thus, lightening the disk is insufficient.

RELATED ART DOCUMENT

Patent Document

Document 1: Patent Publication No. HEI 11-227401
Document 2: Patent Publication No. JP 2005-74500

BRIEF SUMMARY

Problems to be Solved

An object of the invention is to provide a vehicle wheel disk of a single-mounted type and a manufacturing method thereof that is capable of lightening a disk in comparison to a conventional one.

Means for Solving the Problems

The present invention for achieving the above object is as follows:

(1) A vehicle wheel disk according to the present invention, wherein the disk is manufactured from a disk material of a flat plate. The vehicle wheel disk includes a hub coupling portion, a disk flange and a hat connecting the hub coupling portion and the disk flange. The hat includes a hat top protruding outwardly in an axial direction of the disk, a radially inner hat portion connecting the hat top and the hub coupling portion, and a radially outer hat portion connecting the hat top and the disk flange.

In the vehicle wheel disk, a first thickness-reduced portion smaller in thickness than the disk material is formed at the radially outer hat portion.

(2) A vehicle wheel disk according to item (1) above, wherein a second thickness-reduced portion smaller in thickness than the disk material is formed at the disk flange.

(3) A vehicle wheel disk according to item (1) or (2) above, wherein the disk flange includes a thick disk flange portion located at at least an inner end portion of the disk flange in an axial direction of the disk and at least a portion of the disk flange in a circumferential direction of the disk.

(4) A vehicle wheel disk according to any one of items (1)-(3) above, wherein
a vent window is formed at the radially outer hat portion, and
the first thickness-reduced portion is formed at a portion of the radially outer hat portion spaced outwardly from the vent window in a radial direction of the disk.

(5) A vehicle wheel disk according to any one of items (2)-(4) above, wherein the second thickness-reduced portion is provided at an entirety of the disk flange in the axial direction of the disk.

(6) [First to Fourth Embodiments]
A manufacturing method of a vehicle wheel disk according to the present invention, for manufacturing a wheel disk for a vehicle from a disk material,
wherein the wheel disk includes:
a hat including a hat top, a radially outer hat portion and a radially inner hat portion;
a disk flange;
a first disk position (D1) located outer than the hat top in a radial direction of the disk and inner than the disk flange in the radial direction of the disk;
a second disk position (D2) located at a boundary between the radially outer hat portion and the disk flange;
a third disk position (D3) located at an inner end of the disk flange in an axial direction of the disk; and
a fourth disk position (D4) located inner than the second disk position (D2) in the axial direction of the disk and outer than the third disk position (D3) in the axial direction of the disk.

The disk material includes:
a first material position (M1) corresponding to the first disk position (D1);
a second material position (M2) corresponding to the second disk position (D2);
a third material position (M3) corresponding to the third disk position (D3); and
a fourth material position (M4) corresponding to the fourth disk position (D4).

The method comprises:
a first step for ironing a portion or an entirety of a disk material portion from M1 to M2 to a cylindrical portion having a thickness smaller than a thickness of the disk material portion before ironing; and
a second step for changing a diameter of at least one of a disk material portion between M2 and M3 and a disk material portion at M1 so that the disk material portion between M2 and M3 becomes larger in diameter than the disk material portion at M1.

(7) [First to Third Embodiments]

A manufacturing method of a vehicle wheel disk according to item (6) above, wherein at the second step, both the disk material portion between M2 and M3 and the disk material portion between M1 and M2 are enlarged in diameter.

(8) [First to Fourth Embodiments]

A manufacturing method of a vehicle wheel disk according to item (6) or (7) above, wherein at the first step, a disk material portion from M2 to M4 or from M2 to M3 is also ironed.

(9) [First to Fourth Embodiments]

A manufacturing method of a vehicle wheel disk according to item (8) above, wherein at the first step, at least a disk material portion between M3 and M4 is formed to a thick portion larger in thickness than a disk material portion adjacent to the thick portion or a first thickness-reduced portion.

(10) [First to Fourth Embodiments]

A manufacturing method of a vehicle wheel disk according to any one of items (6)-(9) above, further comprising a third step conducted after the second step, for forming the disk material portion between M2 and M3 to a final disk flange configuration.

(11) [First to Fourth Embodiments]

A manufacturing method of a vehicle wheel disk according to item (10) above, wherein at the third step, at least a portion of the disk material portion from M2 to M4 or from M2 to M3 is ironed.

(12) [First to Fourth Embodiments]

A manufacturing method of a vehicle wheel disk according to any one of items (6)-(11) above, wherein the wheel disk includes a hub coupling portion, and the disk material includes a hub coupling portion-corresponding portion and a hat corresponding portion, the hat corresponding portion including a hat top corresponding portion, a radially outer hat portion-corresponding portion and a radially inner hat portion-corresponding portion.

The manufacturing method of a vehicle further comprises a step conducted before the first step, for pre-forming the hub coupling portion-corresponding portion, the radially inner hat portion-corresponding portion and the hat top corresponding portion of the disk material.

Technical Advantages

According to the vehicle wheel disk of item (1) above, since the first thickness-reduced portion smaller in thickness than the disk material is formed at the radially outer hat portion, the vehicle wheel disk can be effectively and surely lightened.

According to the vehicle wheel disk of item (2) above, since the second thickness-reduced portion smaller in thickness than the disk material is formed at the disk flange, a thickness-reduced portion is formed not only at the radially outer hat portion but also at the disk flange. Therefore, the vehicle wheel disk can be lightened more in a case where a thickness-reduced portion is formed only at the disk flange.

According to the vehicle wheel disk of item (3) above, since the disk flange includes the thick disk flange portion, a rigidity of the vehicle wheel disk can be improved and an assembly accuracy of the disk with a vehicle wheel rim is improved.

According to the vehicle wheel disk of item (4) above, since the first thickness-reduced portion is formed at the portion of the radially outer hat portion spaced outwardly from the vent window in the radial direction of the disk, a lightening rate of the disk can be increased, keeping a strength of the vehicle wheel disk.

According to the vehicle wheel disk of item (5) above, since the second thickness-reduced portion is provided at the entirety of the disk flange in the axial direction of the disk, the vehicle wheel disk can be lightened more than a disk where the second thickness-reduced portion is provided at only a portion of the disk flange in the axial direction of the disk.

According to the manufacturing method of a vehicle wheel disk of item (6) above, the method includes the first step for ironing a portion or an entirety of the disk material portion from M1 to M2 to the cylindrical portion having a thickness smaller than a thickness of the disk material portion before ironing. Thus, a thickness-reduced portion thinner than a thickness of the disk material before the first step can be formed at the radially outer hat portion. As a result, the vehicle wheel disk can be more effectively and more surely lightened than a disk where a thickness-reduced portion is provided only at a disk flange. Further, the method includes the second step for changing a diameter of at least one of the disk material portion between M2 and M3 and the disk material portion at M1 so that the disk material portion between M2 and M3 becomes larger in diameter than the disk material portion at M1. As a result, the cylindrical portion which has been formed at the first step can be formed to the radially outer hat portion.

According to the manufacturing method of a vehicle wheel disk of item (7) above, at the second step, both the disk material portion between M2 and M3 and the disk material portion between M1 and M2 are enlarged in diameter. As a result, forming the disk material is more easily conducted than in a case where at least one of a disk material portion between M2 and M3 and a disk material portion between M1 and M2 is shrinked in diameter.

According to the manufacturing method of a vehicle wheel disk of item (8) above, at the first step, a disk material portion from M2 to M4 or from M2 to M3 is also ironed. Thus, a thickness-reduced portion thinner than the thick material before the first step can be formed at not only the radially outer hat portion but also the disk flange. Thus, the vehicle wheel disk can be more effectively and more surely lightened than in a case where the thickness-reduced portion is formed at the disk flange only.

According to the manufacturing method of a vehicle wheel disk of item (9) above, at the first step, at least a disk material portion between M3 and M4 is formed to a thick portion larger in thickness than a disk material portion adjacent to the thick portion or the first thickness-reduced portion. As a result, a crack is prevented from being generated in the disk at the second step (especially, when the second step is a diameter-enlarging step).

According to the manufacturing method of a vehicle wheel disk of item (10) above, after the second step, the third step is provided for forming the disk material portion between M2 and M3 to a final disk flange configuration. As a result, the disk flange can be accurately formed to the final disk flange configuration.

According to the manufacturing method of a vehicle wheel disk of item (11) above, at the third step, at least a portion of the disk material portion from M2 to M4 or from M2 to M3 is ironed. As a result, the vehicle wheel disk can be lightened as well as the disk flange can be formed accurately.

According to the manufacturing method of a vehicle wheel disk of item (12) above, the method further comprises a step conducted before the first step, for pre-forming the hub coupling portion-corresponding portion, the radially inner hat portion-corresponding portion and the hat top corresponding portion of the disk material. As a result, a forming trouble such as a thickness reduction of the radially inner hat portion and the hub coupling portion which may happen if the pre-forming is conducted after the first step can be prevented from happening.

BRIEF DESCRIPTION OF DRAWINGS

FIG. 3 is applicable to a Second embodiment, a Third Embodiment and a Fourth Embodiment of the present invention.

FIG. 4 is applicable to the Second embodiment, the Third Embodiment and the Fourth Embodiment of the present invention.

FIG. 5 is applicable to the Third Embodiment of the present invention where a shape of an ironing portion of a punch is reversed.

FIG. 5 is applicable to the Second embodiment and the Fourth Embodiment of the present invention.

FIG. 6 is applicable to the Third Embodiment of the present invention if a shape of the ironing portion of the punch is reversed.

FIG. 6 is applicable to the Second embodiment and the Fourth Embodiment of the present invention.

FIG. 7 is applicable to the Second embodiment and the Fourth Embodiment of the present invention.

FIG. 8 is applicable to the Third Embodiment of the present invention if a thickness of a thickness-reduced portion is reversed.

FIG. 8 is applicable to the Second embodiment of the present invention.

FIG. 9 is applicable to the Second embodiment and the Third Embodiment of the present invention.

FIG. 10 is applicable to the Third Embodiment of the present invention.

FIG. 11 is applicable to the Second embodiment, the Third Embodiment and the Fourth Embodiment of the present invention.

FIG. 12 is applicable to the Third Embodiment of the present invention if a shape of the ironing apparatus and a shape of a cylindrical portion are reversed.

FIG. 12 is applicable to the Second embodiment and the Fourth Embodiment of the present invention.

FIG. 13 is applicable to the Third Embodiment of the present invention if a shape of the ironing apparatus and a shape of a cylindrical portion are reversed.

FIG. 13 is applicable to the Second embodiment and the Fourth Embodiment of the present invention.

FIG. 14 is applicable to the Third Embodiment of the present invention if a shape of a cylindrical portion is reversed.

FIG. 14 is applicable to the Second embodiment and the Fourth Embodiment of the present invention.

FIG. 15 is applicable to the Third Embodiment of the present invention if a shape of a cylindrical portion is reversed.

FIG. 15 is applicable to the Second embodiment and the Fourth Embodiment of the present invention.

FIG. 16 is applicable to the Third Embodiment of the present invention if a shape of a cylindrical portion is reversed.

FIG. 16 is applicable to the Second embodiment and the Fourth Embodiment of the present invention.

FIG. 17 is applicable to the Third Embodiment of the present invention if a shape of a cylindrical portion is reversed.

FIG. 17 is applicable to the Second embodiment and the Fourth Embodiment of the present invention.

FIG. 18 is (a) a plane view and (b) a cross-sectional view of a diameter-changing apparatus in a second step used in a manufacturing method of the vehicle wheel disk according to an alteration of the First Embodiment of the present invention, where in (a) the plane view, a lower half of the diameter-changing apparatus is not shown, and in the cross-sectional view, a left half of a disk material is omitted and hatchings of the diameter-changing apparatus are omitted in order to clarify the drawing.

FIG. 18 is applicable to the Second embodiment and the Third Embodiment of the present invention.

FIG. 19 is applicable to the Second embodiment, the Third Embodiment and the Fourth Embodiment of the present invention.

FIG. 20 is applicable to the Third Embodiment of the present invention if a thickness of a thickness-reduced portion is reversed.

FIG. 22 is applicable to the Second Embodiment and the Third Embodiment of the present invention.

FIG. 23 is applicable to the Second Embodiment and the Third Embodiment of the present invention.

FIG. 24 is applicable to the Second Embodiment of the present invention if a thickness of a thickness-reduced portion is reversed.

FIG. 24 is applicable to the Third Embodiment of the present invention.

DETAILED DESCRIPTION

A vehicle wheel disk and a manufacturing method thereof according to an embodiment of a present invention will be explained below with reference to drawings.

Figure 2:
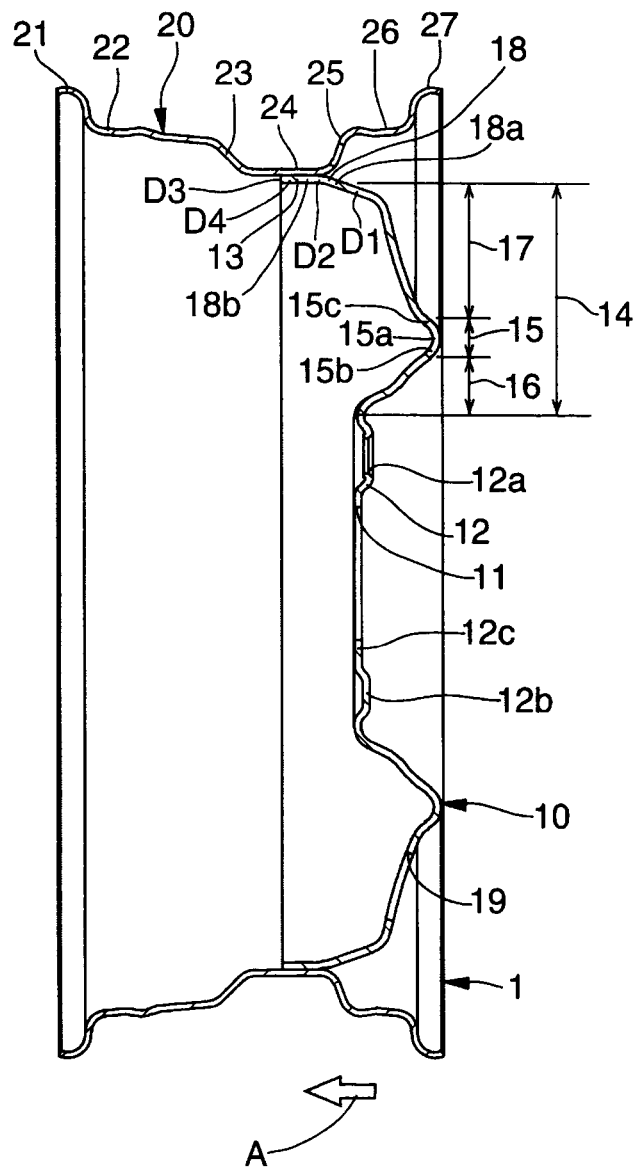
FIG. 2 is a cross-sectional view of the vehicle wheel disk according to the present invention in the case where the disk is coupled with the rim.
Figure 25:
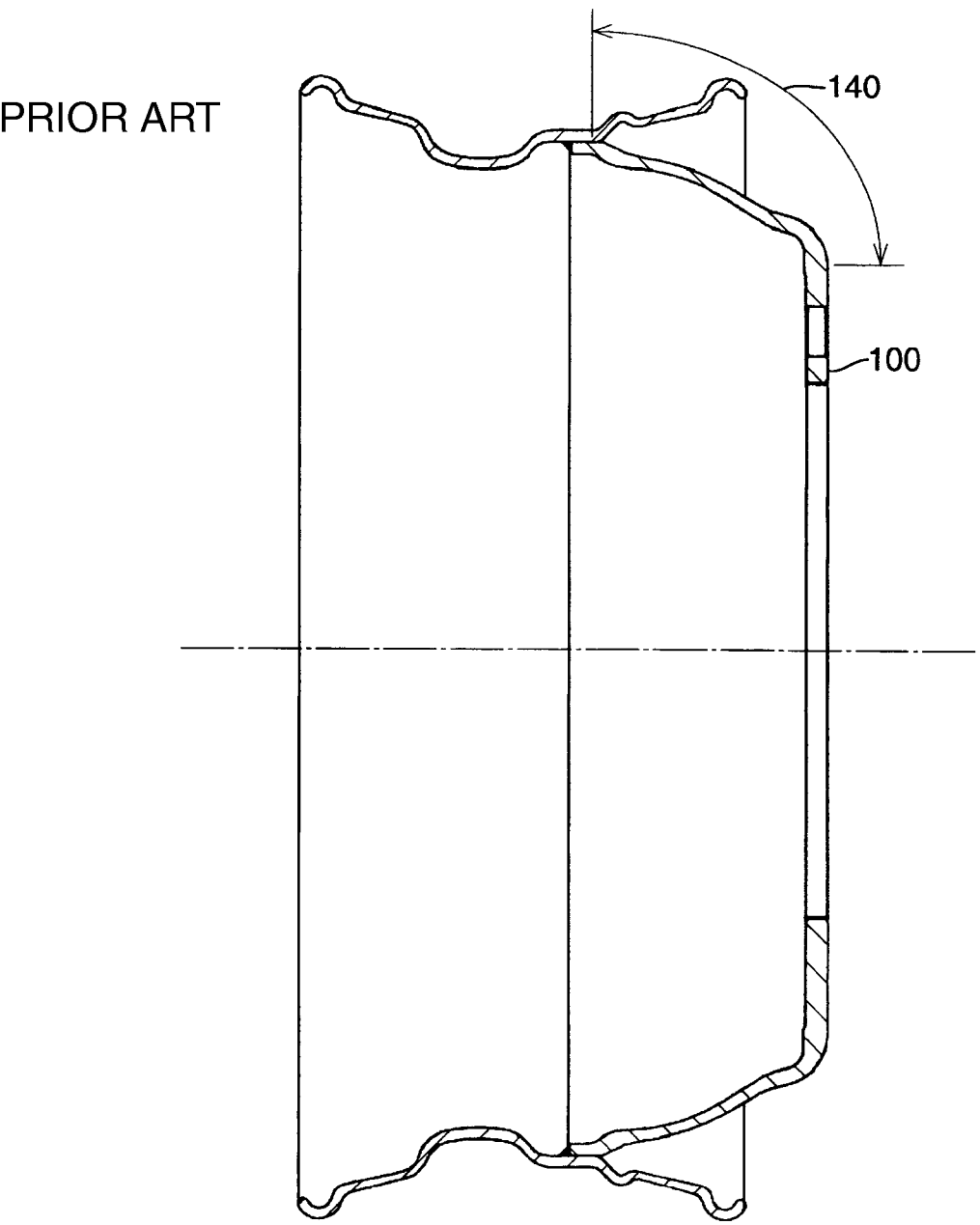
FIG. 25 is a cross-sectional view of a vehicle wheel different from the present invention, for a double-mounted type wheel used for a truck or a bus, etc.

First, a vehicle wheel disk according to the embodiment of the present invention will be explained with reference to drawings. As illustrated in FIG. 2, a vehicle wheel disk (which may be called a wheel disk or a disk, hereinafter) 10, according to the embodiment of the present invention, is a disk for a single-mounted type wheel (including a hat and used for a passenger car, etc.) The disk 10 is not a disk 100 for a double-mounted type wheel (not including a hat and basically used for a truck or a bus, etc.) as illustrated in FIG. 25. The disk 10 includes a wheel disk manufactured from a disk material of a flat plate. The disk 10 may be made from steel. Alternatively, the disk 10 may be made from aluminum alloy, titanium alloy or magnesium alloy, etc. The disk 10 is manufactured independently of an annular rim (a portion of a wheel holding a tire (not shown)) 20 and is coupled with the rim 20 by welding, a rivet, or an adhesive to construct a wheel 1.

The rim 20 is fabricated from a plate material. The rim 20 includes an inboard flange portion 21, an inboard bead seat portion 22, an inboard side wall portion 23, a drop portion 24, an outboard side wall portion 25, an outboard bead seat portion 26 and an outboard flange portion 27. The inboard flange portion 21, the inboard bead seat portion 22 and the inboard side wall portion 23 are portions located nearer to a central portion of a vehicle (a central portion in a width direction of the vehicle) in an axial direction of the disk (an axial direction of the wheel) than the outboard side wall portion 25, the outboard bead seat portion 26 and the outboard flange portion 27, when the wheel 1 is mounted to the vehicle.

The disk 10 includes a hub hole 11, a hub coupling portion 12, a disk flange 13, a hat 14 and a thickness-reduced portion 18. The hat 14 includes a hat top 15, a radially inner hat portion 16 and a radially outer hat portion 17. The disk 10 includes a first disk position (D1) located outer than the hat top 15 in a radial direction of the disk and inner than the disk flange 13 in the radial direction of the disk, a second disk position (D2) located at a boundary between the radially outer hat portion 17 and the disk flange 13, a third disk position (D3) located at an inner end of the disk flange 13 in the axial direction of the disk, and a fourth disk position (D4) located inner than the second disk position (D2) in the axial direction of the disk and outer than the third disk position (D3) in the axial direction of the disk. In a case where a thick disk flange portion 13c which is described below is provided at an entirety of the disk flange 13, the second disk position (D2) and the fourth disk position (D4) are the same position. In the FIGS., "A" shows an inward in the axial direction of the disk.

Figure 1:
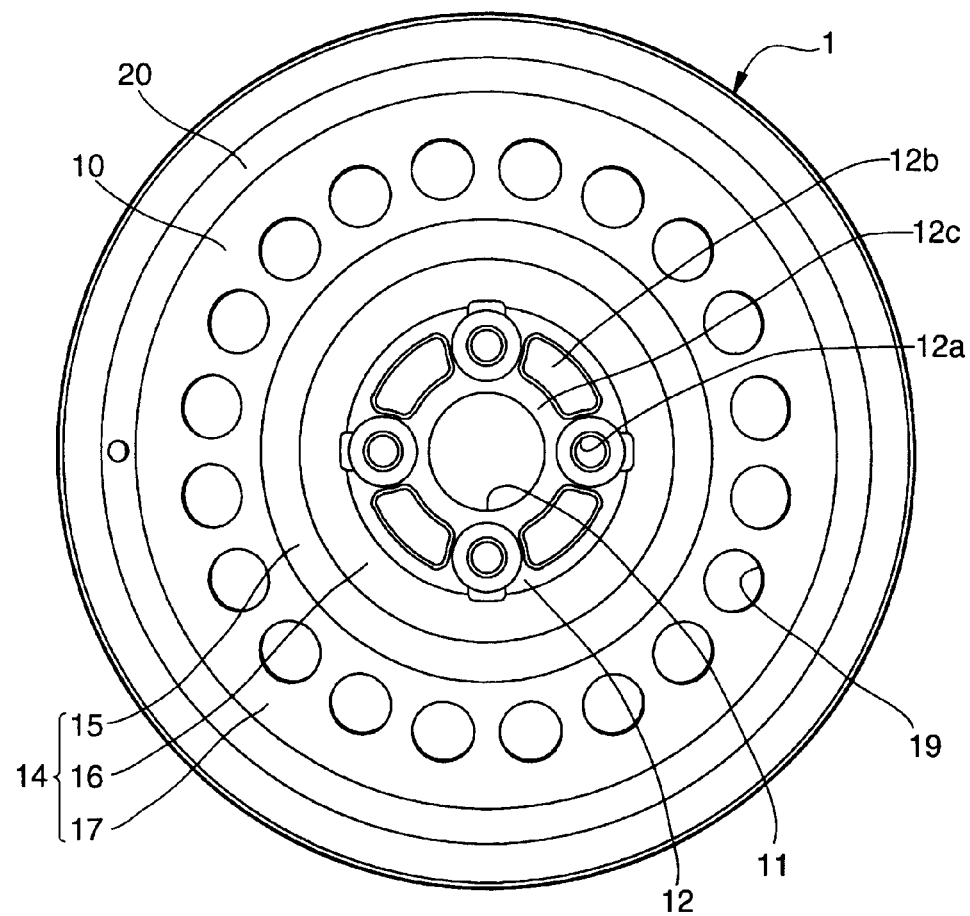
FIG. 1 is a front view of a vehicle wheel disk according to the present invention in a case where the disk is coupled with a rim.

As illustrated in FIG. 1, the hub hole 11 is located at a central portion of the disk 10 in the radial direction of the disk 10 (in a radial direction of the wheel). The hub coupling portion 12 is surround the hub hole 11. The hub coupling portion 12 is like a flat plate or a substantially flat plate and is located in a plane perpendicular or substantially perpendicular to the axial direction of the disk (in an axial direction of the wheel). A plurality of hub bolt holes 12a is provided at an intermediate portion of the hub coupling portion 12. The hub bolt holes 12a are provided on a circle having a constant radius and at an equal interval in a circumferential direction of the disk. For example, four hub bolt holes 12a are provided. However, the number of the hub bolt holes 12a is not limited to four, and may be three, five or more. The disk 10 (or the wheel 1) is fixed to a hub (not shown) of the vehicle by causing a hub bolt (not shown) extending from the hub of the vehicle to extend through the hub bolt holes 12a and coupling a hub nut (not shown) to the hub bolt. Alternatively, the disk 10 (or the wheel 1) is fixed to the hub by coupling the hub bolt to a tap hole provided at the hub coupling portion 12. A hub coupling portion-flat portion 12c which is a flat potion of the hub coupling portion 12 is not thinned by ironing. Thus, a thickness of the hub coupling portion-flat portion 12c is substantially the same thickness as a thickness of the disk material.

As illustrated in FIGS. 1 and 2, a rib 12b may be provided at the hub coupling portion 12, the rib 12b being located between adjacent the hub coupling portions 12 in a circumferential direction of the disk and convexly swelling axially outward direction of the disk. The rib 12b is provided at the hub coupling portion 12 in order to improve a rigidity and a durability of the hub coupling portion 12. Since the disk 10 is a disk not for the double-mounted type wheel but for the single-mounted type wheel, the rib 12b can be provided at the hub coupling portion 12. Generally, the rib 12b is not provided at the disk 100 (shown in FIG. 25) for the double-mounted type wheel. This is because an inner surface or an outer surface of the hub coupling portion 12 in the axial direction of the disk needs to be contacted the hub or a hub coupling portion of another wheel depend on a mounting position of the disk 100. Forming the rib 12b is difficult in the disk for the double-mounted type wheel, since a thickness of the disk is relatively large due to a reason for mounting the disk with the hub of the vehicle whereby a rigidity and a strength of the disk are increased.

Figure 3:
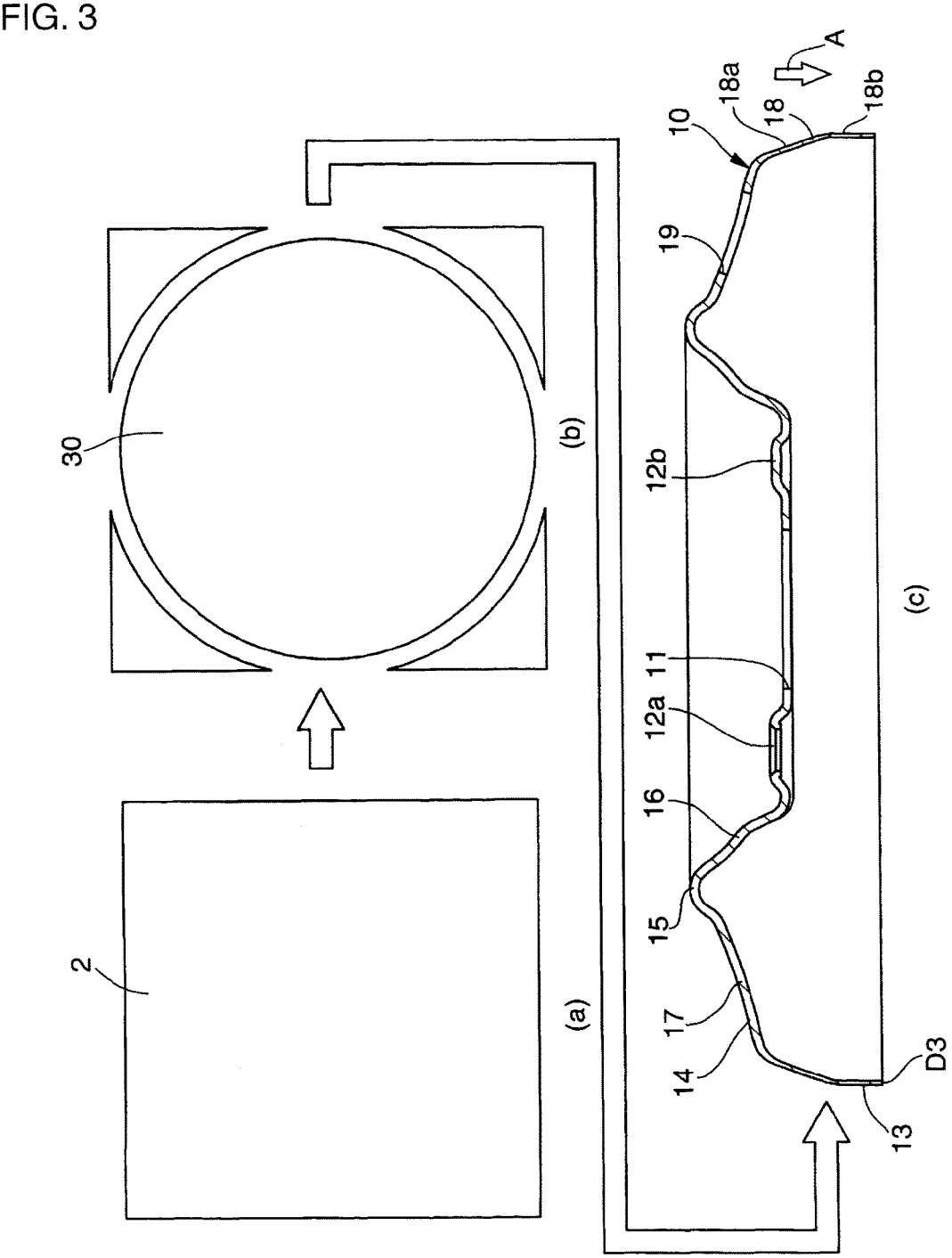
FIG. 3 is a process diagram of a manufacturing method of the vehicle wheel disk according to a First Embodiment of the present invention, where
(a) illustrates a flat plate,
(b) illustrates a circular disk material before a first step, and
(c) illustrates a cross-sectional view of the wheel disk.
Figure 11:
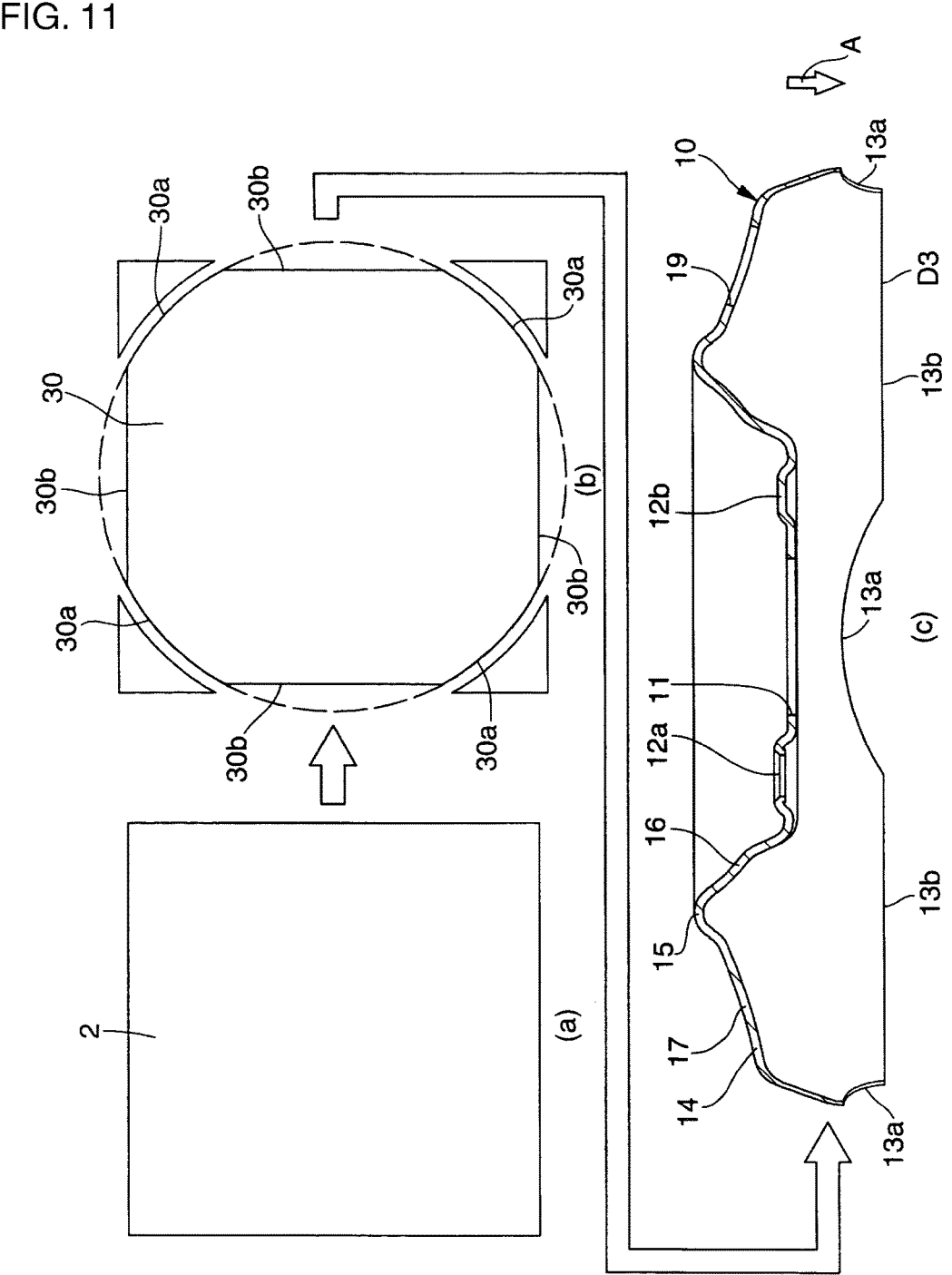
FIG. 11 is a process diagram of a manufacturing method of the vehicle wheel disk according to an alteration of the First Embodiment of the present invention, where
(a) illustrates a flat plate,
(b) illustrates a disk material before a first step manufactured by cutting every corner of a square flat plate in an arc, and
(c) illustrates the wheel disk.

As illustrated in FIG. 2, the disk flange 13 is located at or near a radially outer end portion of the disk 10. The disk flange 13 is like a ring continuous in the circumferential direction of the disk. Alternatively, the disk flange 13 may be like a ring discontinuous partially in the circumferential direction of the disk. The disk flange 13 extends straight in the axial direction of the disk in a cross section taken along a radially extending plane of the disk (i.e., in a cross section taken along a plane perpendicular to the circumferential direction of the disk). As illustrated in FIGS. 2 and 3 (c), the inner end of the disk flange 13 in the axial direction of the disk (the third disk position D3) may be located in a single plane over its entire circumferential length. As illustrated in FIG. 11 (c), the inner end of the disk flange 13 in the axial direction of the disk (the third disk position D3) may include a ventilation 13a curved concavely outwardly in the axial direction of the disk. As illustrated in FIG. 2, the disk flange 13 is fit into the drop 24 of the rim 20 and coupled (e.g., fixed, welded) to the drop 24. The disk flange 13 is a portion from the third disk position D3 to a disk portion where both an inner surface and an outer surface of the disk 10 start to be inclined in a direction crossing the axial direction of the disk 10 in the axial direction of the disk.

The hat 14 is provided at between the hub coupling portion 12 and the disk flange 13 in the radial direction of the disk, and connects the hub coupling portion 12 and the disk flange 13. The hat 14 has a portion located outer than the hub coupling portion 12 and the disk flange 13 in the axial direction of the disk. At least the hat top 15 of the hat 14 is located outer than the hub coupling portion 12 and the disk flange 13 in the axial direction of the disk.

In a cross section taken along any radially extending plane, a top point 15a is the most outward point in the axial direction of the disk among the hat top 15 (or the disk 10). A position of the top point 15a in the axial direction of the disk may be constant or may vary in the circumferential direction of the disk. When the position of the top point 15a in the axial direction of the disk varies in the circumferential direction of the disk, it is preferable that portions of the top point 15a located at different axial positions are smoothly connected to each other in the circumferential direction of the disk in points of durability and formability.

The radially inner hat portion 16 is provided at between the hub coupling portion 12 and the hat top 15 in the radial direction of the disk, and connects the hub coupling portion 12 and the hat top 15. In a cross section taken along a radially extending plane, an entirety or an almost entirety of the radially inner hat portion 16 is inclined outwardly in the radial direction of the disk and outwardly in the axial direction of the disk. The hub coupling portion 12 and the hat top 15 are smoothly connected by the radially inner hat portion 16.

The radially outer hat portion 17 is provided between the hat top 15 and the disk flange 13 in the radial direction of the disk, and connects the hat top 15 and the disk flange 13. In a cross section taken along a radially extending plane, an entirety or an almost entirety of the radially outer hat portion 17 is inclined outwardly in the radial direction of the disk and inwardly in the axial direction of the disk.

The hat top 15 protrudes outwardly in the axial direction of the disk. The hat top 15 is provided at in order to secure a rigidity and a strength of the disk 10. As illustrated in FIG. 2, the hat top 15 protrudes outwardly in the axial direction of the disk in a shape of an arc. The hat top 15 includes a top point 15a extending continuously in the circumferential direction of the disk, a radially inner curved portion 15b curved inwardly in the axial direction of the disk radially inside the top point 15a and a radially outer curved potion 15c curved inwardly in the axial direction of the disk radially outside the top point 15a. The hat 14 extends outwardly in the radial direction of the disk from the hub coupling portion 12. The hat 14 (a) extends outwardly in the axial direction of the disk at the radially inner hat portion 16, (b) changes a direction and extends from an outward to an inward in the axial direction of the disk at the hat top 15, (c) extends inwardly in the axial direction of the disk at the radially outer hat portion 17, and (d) is connected to the disk flange 13, in that order from the inward in the radial direction of the disk. Thus, a distance between the hub coupling portion 12 and the disk flange 13 in the axial direction of the disk is small, whereby a large bending moment does not act on the disk 10 when the wheel 1 is installed to a vehicle and a load acts on the hub coupling portion 12 from the hat 14 via a tire and the rim 20. In contrast, since the disk 100 illustrated in FIG. 25 for the double-mounted type wheel does not include the radially inner hat portion 16 and the hat top 15 and since a distance between a hub coupling portion and a disk flange in an axial direction of the disk is large, a large bending moment acts on the disk 100. As a result, a stress condition acted on the hat 14 of the disk 10 is different from a stress condition acted on a hat 140 of the disk 100 for the double-mounted type wheel.

A vent window 19 is formed at the radially outer hat portion 17. The vent window 19 is provided at an intermediate portion of the radially outer hat portion 17 in the radial direction of the disk. As illustrated in FIG. 1, a plurality of vent windows 19 is provided and spaced equally along the circumferential direction of the disk. However, the vent window 19 may not be provided. The vent windows 19 may not be spaced equally along the circumferential direction of the disk. One vent window 19 only may be provided. Since a large plastic deformation is not occurred by press-forming and a thickness is not thinned by ironing, when the vehicle wheel disk is formed, a thickness of an entirety (for example, a portion radially inside the vent window 19) of the radially outer hat portion 17 except a first thickness-reduced portion which is described below is substantially the same as the thickness of the disk material.

By ironing the disk material 30 of the flat plate illustrated in FIG. 3 (b) or FIG. 11 (b), the thickness-reduced portion 18 is smaller in thickness than the disk material 30 before ironing, and the disk material 30 before ironing is substantially the same in thickness as the hub coupling portion-flat portion 12c of the disk 10 or the radially outer hat portion 17 except the thickness-reduced portion 18. The first disk position (D1) is located at a boundary between a thinned portion by ironing and a not thinned portion by ironing of the radially outer hat portion 17. The thickness-reduced portion 18 is not a portion where the thickness of the disk material 30 is thinned by shrinkage of material at press-forming. The thickness of the thickness-reduced portion 18 may be smaller than 80 percent of the thickness of the disk material 30 before ironing or may be smaller than 50 percent of the thickness of the disk material 30 before ironing. A thickness of the thinnest portion in the thickness-reduced portion 18 may be 1 mm. The thickness of the disk material 30 may be thinned by flow-forming, etc.

It is preferable that the thickness-reduced portion 18 is provided at outer than 80 percent (including 80 percent) of an outside diameter of the disk 10 in the radial direction of the disk. This is because a crack is prevented from being generated in the disk 10 including the thickness-reduced portion 18 at the time of forming. However, the percentage depends on properties of the plate material and the percentage may not be 80 percent.

As illustrated in FIG. 2, the thickness-reduced portion 18 includes a first thickness-reduced portion 18a formed at the radially outer hat portion 17. Further, the thickness-reduced portion 18 may include a second thickness-reduced portion 18b formed at the disk flange 13. When the thickness-reduced portion 18 includes the first thickness-reduced portion 18a and the second thickness-reduced portion 18b, the first thickness-reduced portion 18a and the second thickness-reduced portion 18b may be or may not be connected to each other in the axial direction of the disk.

The first thickness-reduced portion 18a is provided at or near a radially outer end portion of the radially outer hat portion 17. The first thickness-reduced portion 18a is provided at from the first disk position D1 to the second disk position D2. In a case where the vent window 19 is provided at an intermediate portion only of the radially outer hat portion 17 in the radial direction of the disk, the first thickness-reduced portion 18a is provided at a portion of the radially outer hat portion 17 spaced outwardly from the vent window 19 in the radial direction of the disk. However, the first thickness-reduced portion 18a may be also provided at a portion or an entirety of a surrounding portion of the vent window 19. The thickness of the first thickness-reduced portion 18a may be constant or may not be constant in the first thickness-reduced portion 18a. For example, at least a portion of the first thickness-reduced portion 18a located at the surrounding portion of the vent window 19 may be larger in thickness than another portion of the first thickness-reduced portion 18a. A thickness of a portion of the first thickness-reduced portion 18a may be substantially the same as the thickness of the disk material.

The second thickness-reduced portion 18b is provided at a portion or the entirety (whole area) of the disk flange 13 in the axial direction of the disk. The second thickness-reduced portion 18b is provided at a portion or an entirety (whole area) from the second disk position D2 to the third disk position D3. The thickness of the second thickness-reduced portion 18b may be constant or may not be constant in the second thickness-reduced portion 18b. The thickness of the second thickness-reduced portion 18b may be the same as the thickness of the first thickness-reduced portion 18a, may be larger than the thickness of the first thickness-reduced portion 18a or may be smaller than the thickness of the first thickness-reduced portion 18a. A thickness of a portion of the second thickness-reduced portion 18b may be substantially the same as the thickness of the disk material.

Figure 24:
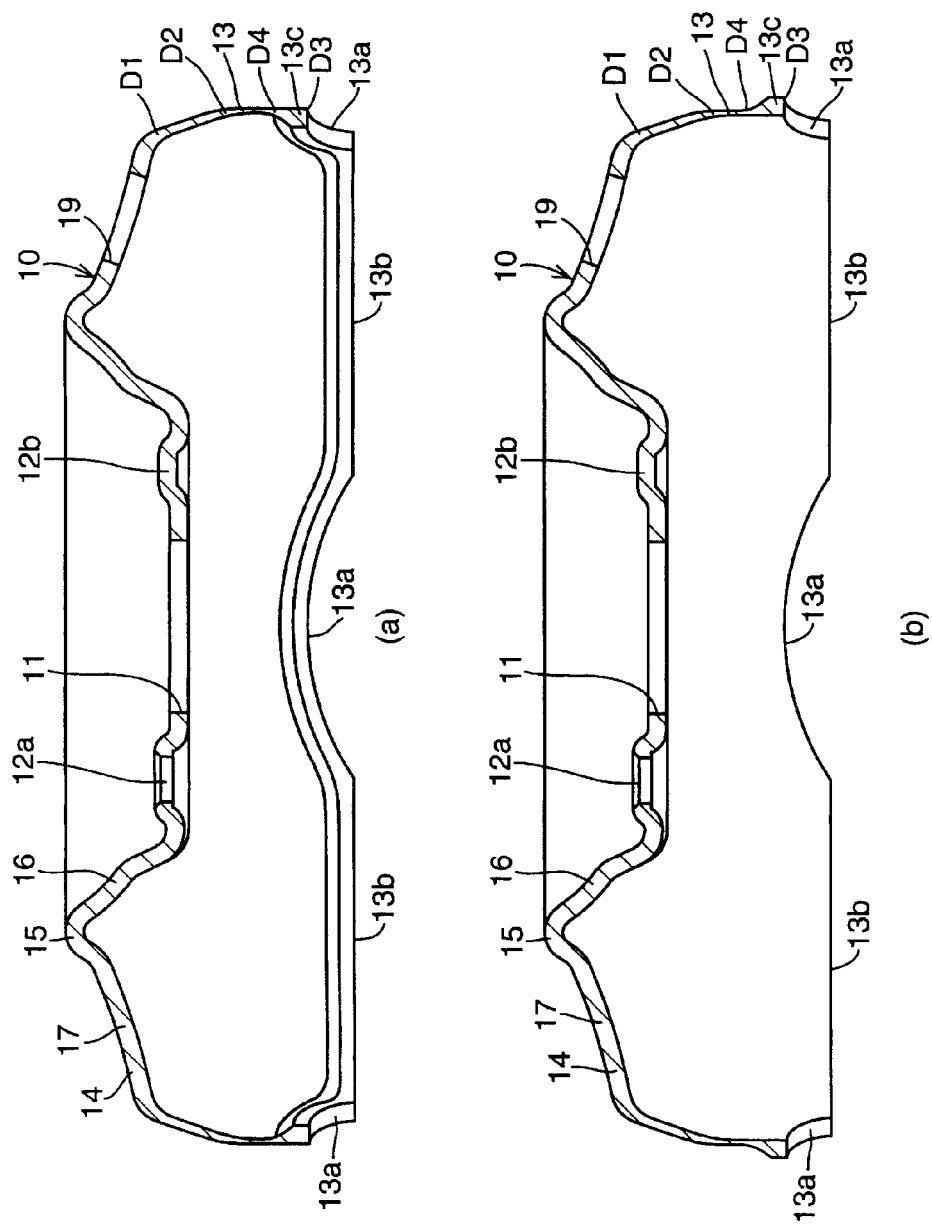
FIG. 24 is a cross-sectional view of a manufacturing method of the vehicle wheel disk after a third step according to an alteration of the First Embodiment of the present invention, where
(a) illustrates a case where a thick disk flange portion protrudes inwardly in a radial direction of the disk material, and
(b) illustrates a case where a thick disk flange portion protrudes outwardly in a radial direction of the disk material.

A thick disk flange portion 13c may be provided at at least the axially inner end (for example, from the third disk position D3 to the fourth disk position D4) of the disk flange 13 in the axial direction of the disk. The thick disk flange portion 13c is larger in thickness than a disk portion adjacent to the thick disk flange portion 13c in the axial direction of the disk. The disk portion adjacent to the thick disk flange portion 13c in the axial direction of the disk is, for example, from the second disk position D2 to the fourth disk position D4, or from the first disk position D to the second disk position D2 when the thick disk flange portion 13c is provided at the entirety of the disk flange 13. The thick disk flange portion 13c is provided at at least a portion of the disk flange 13 in the circumferential direction of the disk. The thick disk flange portion 13c may be provided continuously in the circumferential direction of the disk or may be provided discontinuously in the circumferential direction of the disk. The thick disk flange portion 13c may protrude inwardly in the radial direction of the disk as illustrated in FIG. 24 (a) or may protrude outwardly in the radial direction of the disk as illustrated in FIG. 24 (b). Alternatively, the thick disk flange portion 13c may protrude inwardly and outwardly in the radial direction of the disk. When the thick disk flange portion 13c protrudes outwardly in the radial direction of the disk, a contact area between the disk 10 and the rim 20 becomes small, an assembly accuracy between the disk 10 and the rim 20 is improved, and a deflection accuracy of the wheel 1 is improved. When the thick disk flange portion 13c protrudes inwardly in the radial direction of the disk, the rigidity of the disk 10 is improved. Further, when the thick disk flange portion 13c protrudes inwardly in the radial direction of the disk and when the disk 10 is assembled with the rim 20, since a thickness of a welding portion of the disk flange 13 with the rim is thick, welding the disk with the rim becomes easy. A maximum of the thickness of the thick disk flange portion 13c may be the same as the thickness of the disk material, may be larger than the thickness of the disk material or may be smaller than the thickness of the disk material. As illustrated in FIG. 24, a configuration of a cross section of the disk between the first disk position D1 and the second disk position D2 may be constructed of a straight line, an arc as a whole or another configuration.

Figure 20:
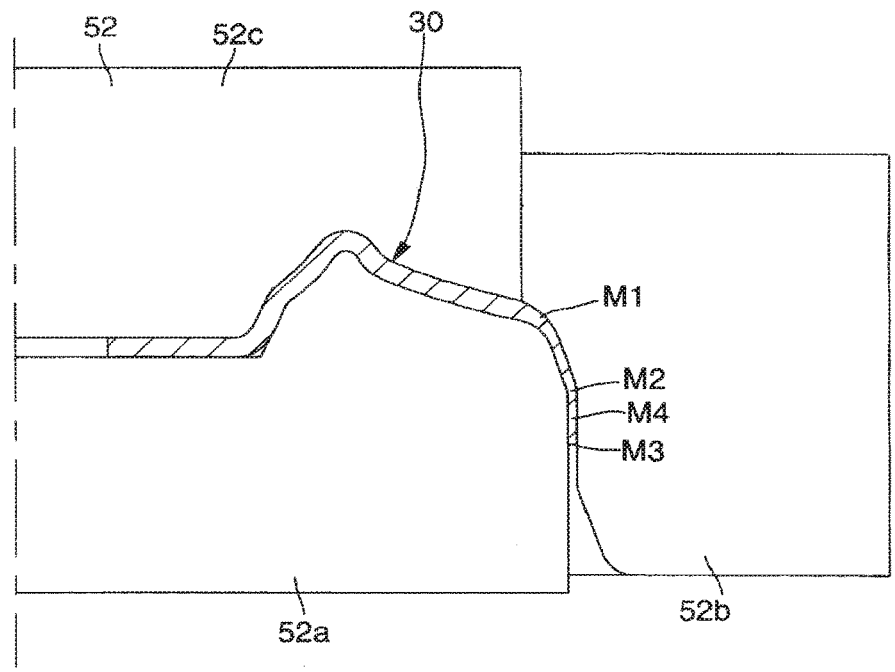
FIG. 20 is a cross-sectional view of a forming apparatus after a third step used in a manufacturing method of the vehicle wheel disk according to the Second Embodiment of the present invention, where a left half of the forming apparatus is not shown and hatchings of the forming apparatus are omitted in order to clarify the drawing.
Figure 21:
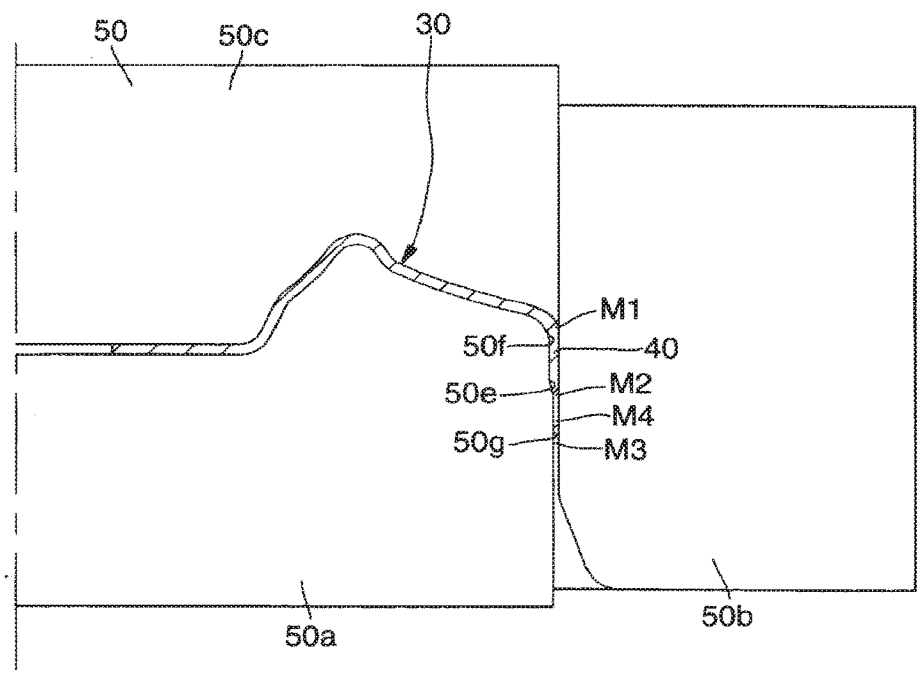
FIG. 21 is a cross-sectional view of an ironing apparatus after a first step used in a manufacturing method of the vehicle wheel disk according to the Third Embodiment of the present invention, where a left half of the ironing apparatus is not shown and hatchings of the ironing apparatus are omitted in order to clarify the drawing.
Figure 22:
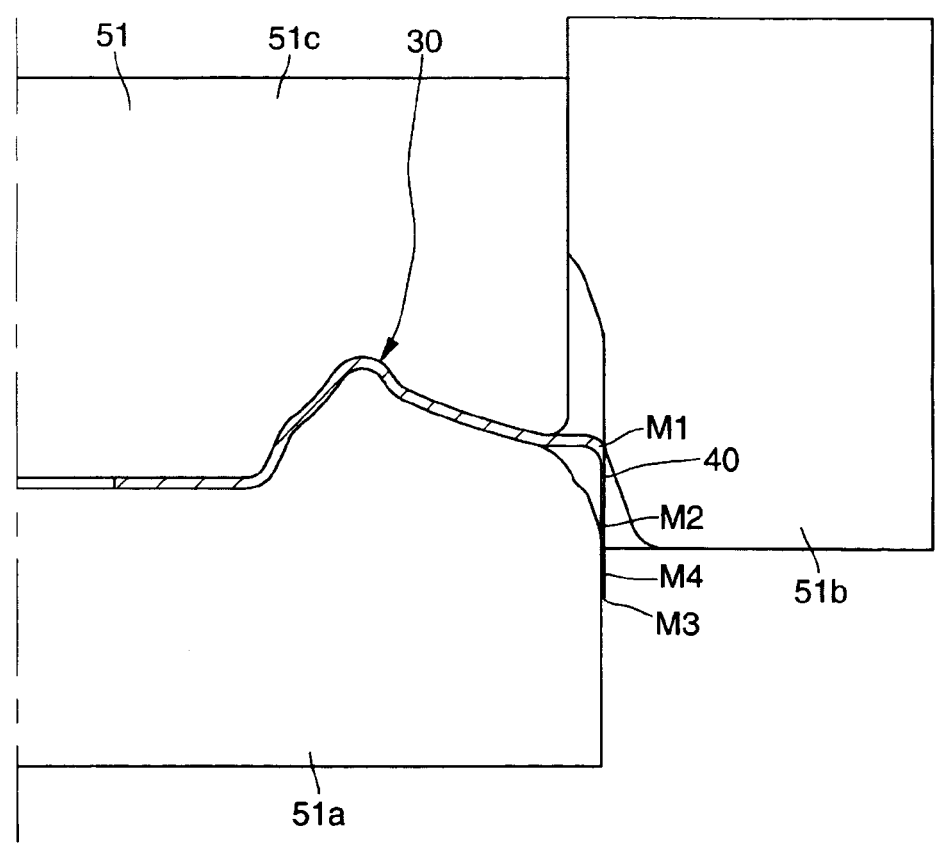
FIG. 22 is a cross-sectional view of a diameter-changing apparatus (diameter-shrinking apparatus) just before a second step used in a manufacturing method of the vehicle wheel disk according to the Fourth Embodiment of the present invention, where a left half of the diameter-changing apparatus is not shown and hatchings of the diameter-changing apparatus are omitted in order to clarify the drawing.
Figure 23:
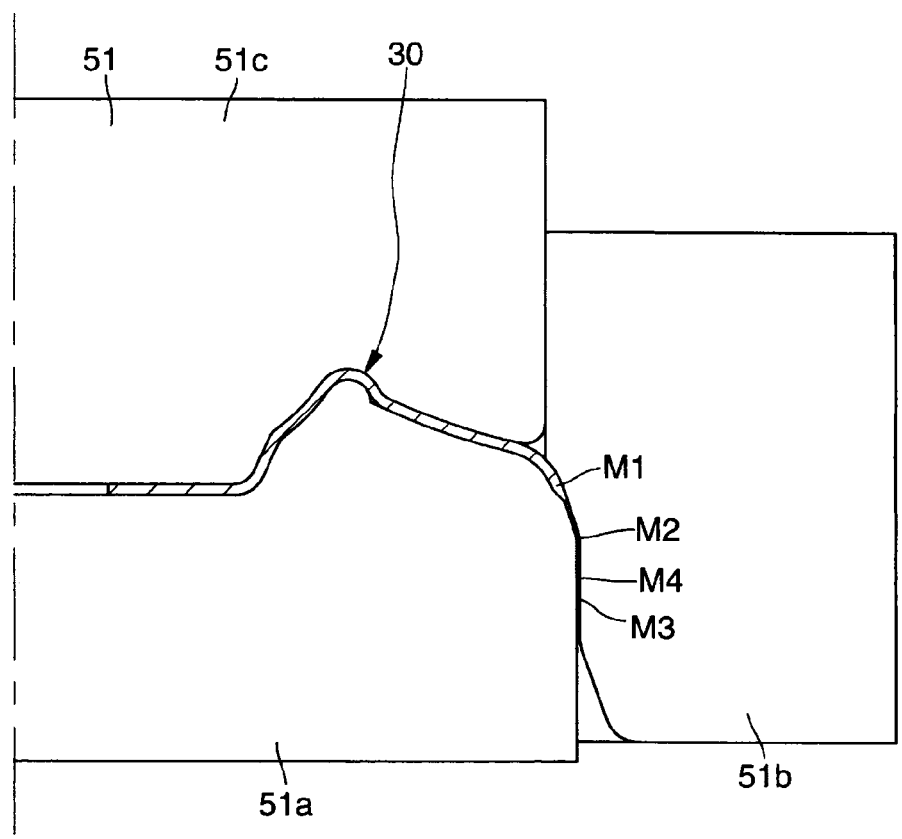
FIG. 23 is a cross-sectional view of the diameter-changing apparatus (diameter-shrinking apparatus) after the second step used in the manufacturing method of the vehicle wheel disk according to the Fourth Embodiment of the present invention, where a left half of the diameter-changing apparatus is not shown and hatchings of the diameter-changing apparatus are omitted in order to clarify the drawing.

Next, a manufacturing method of the vehicle wheel disk 10 according to the present invention will be explained with reference to drawings. FIGS. 3-19 illustrate a manufacturing method of the vehicle wheel disk according to a first embodiment of the present invention. FIG. 20 illustrates a manufacturing method of the vehicle wheel disk according to a second embodiment of the present invention. FIG. 21 illustrates a manufacturing method of the vehicle wheel disk according to a third embodiment of the present invention. FIGS. 22 and 23 illustrate a manufacturing method of the vehicle wheel disk according to a fourth embodiment of the present invention.

Portions common over all embodiments of the present invention are denoted with the same reference numerals over all embodiments of the present invention.

First, portions common over all embodiments of the present invention will be explained.

Figure 4:
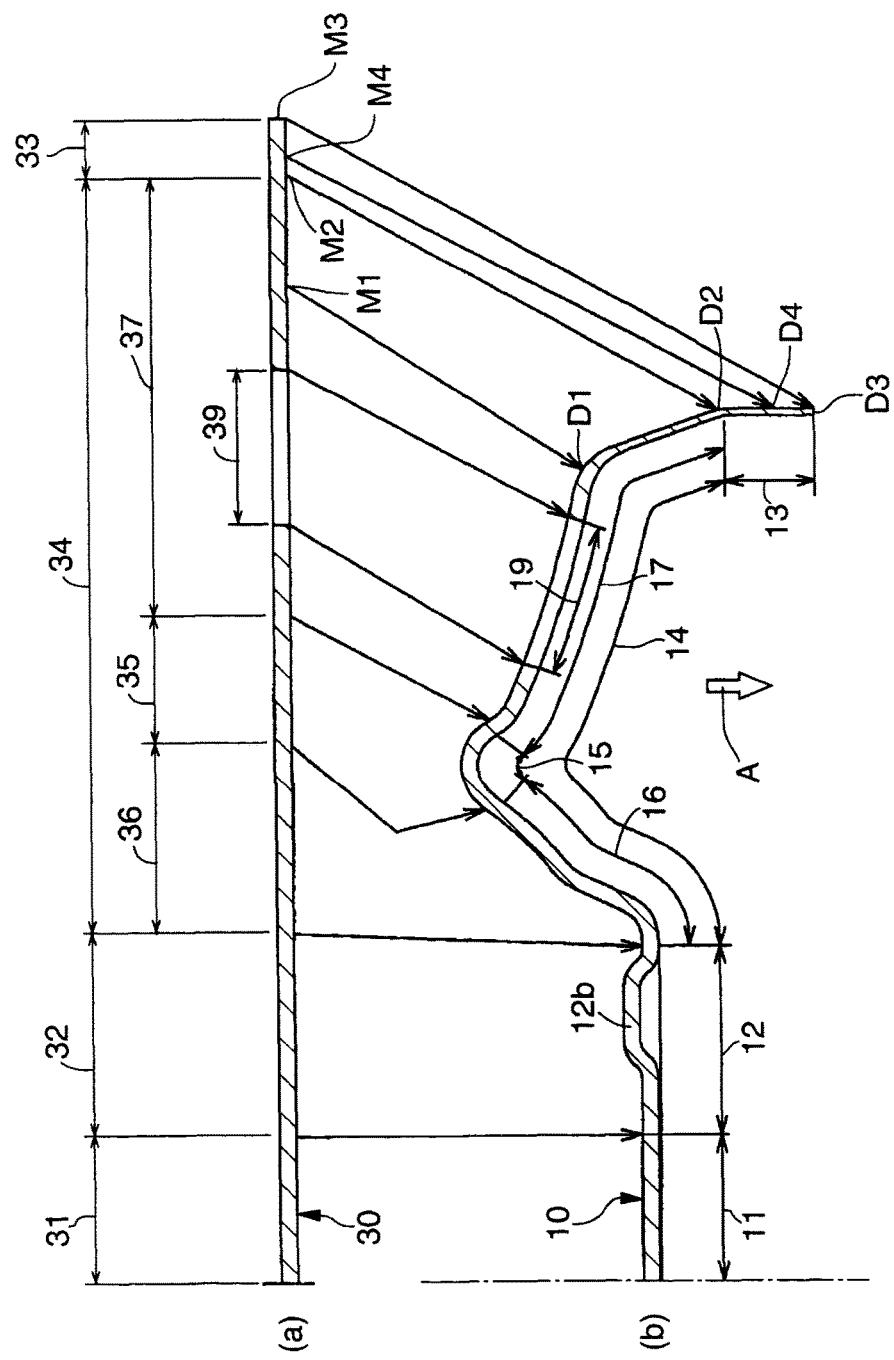
FIG. 4 is a cross-sectional view of the disk material and the wheel disk of the manufacturing method of the vehicle wheel disk according to the First Embodiment of the present invention, where,
a left half of the disk material and a left half of the wheel disk are not shown,
(a) illustrates the disk material before the first step, and
(b) illustrates the wheel disk.

As illustrated in FIG. 4, a manufacturing method of the vehicle wheel disk 10 according to the present invention is a method for manufacturing the vehicle wheel disk 10 from the disk material 30.

The disk material 30 includes a hub hole corresponding portion 31 corresponding to the hub hole 11, a hub coupling portion-corresponding portion 32 corresponding to the hub coupling portion 12, a disk flange corresponding portion 33 corresponding to the disk flange 13, a hat corresponding portion 34 corresponding to the hat 14, a hat top corresponding portion 35 corresponding to the hat top 15, a radially inner hat portion-corresponding portion 36 corresponding to the radially inner hat portion 16, a radially outer hat portion-corresponding portion 37 corresponding to the radially outer hat portion 17 and a vent window corresponding portion 39 corresponding to the vent window 19. The disk material 30 also includes a first material position M1 corresponding to the first disk position D1, a second material position M2 corresponding to the second disk position D2, a third material position M3 corresponding to the third disk position D3 and a fourth material position M4 corresponding to the fourth disk position D4.

The disk flange corresponding portion 33 becomes the disk flange 13 when the disk 10 is manufactured from the disk material 30. The hat corresponding portion 34 becomes the hat 14 when the disk 10 is manufactured from the disk material 30. The hat top corresponding portion 35 becomes the hat top 15 when the disk 10 is manufactured from the disk material 30. The radially inner hat portion-corresponding portion 36 becomes the radially inner hat portion 16 when the disk 10 is manufactured from the disk material 30. The radially outer hat portion-corresponding portion 37 becomes the radially outer hat portion 17 when the disk 10 is manufactured from the disk material 30. The vent window corresponding portion 39 becomes the vent window 19 by press-punching when the disk 10 is manufactured from the disk material 30. The first material position M1 becomes the first disk position D1 when the disk 10 is manufactured from the disk material 30. The second material position M2 becomes the second disk position D2 when the disk 10 is manufactured from the disk material 30. The third material position M3 becomes the third disk position D3 when the disk 10 is manufactured from the disk material 30. The fourth material position M4 becomes the fourth disk position D4 when the disk 10 is manufactured from the disk material 30.

As illustrated in FIGS. 3 and 11, the disk material 30 is a material of a flat plate where four corners of a square (including a substantially square) flat plate 2 are cut by press-punching, etc. The disk material 30 may be a circular flat plate not having a straight line as illustrated in FIG. 3 (b) or may be a flat plate having arc portions 30a and straight line portions 30b as illustrated in FIG. 11 (b). When a shape of the disk material 30 is as illustrated in FIG. 3 (b), the wheel disk 10 manufactured from the disk material 30 does not have the ventilation 13a (shown in FIG. 11 (c)). When a shape of the disk material 30 is as illustrated in FIG. 11 (b), the wheel disk 10 manufactured from the disk material 30 has the ventilation 13a as illustrated in FIG. 11 (c). When the shape of the disk material 30 is as illustrated in FIG. 11 (b), the arc portion 30a becomes a generally end portion 13b which is not the ventilation 13a and the straight line portion 30b becomes the ventilation 13a.

Figure 5:
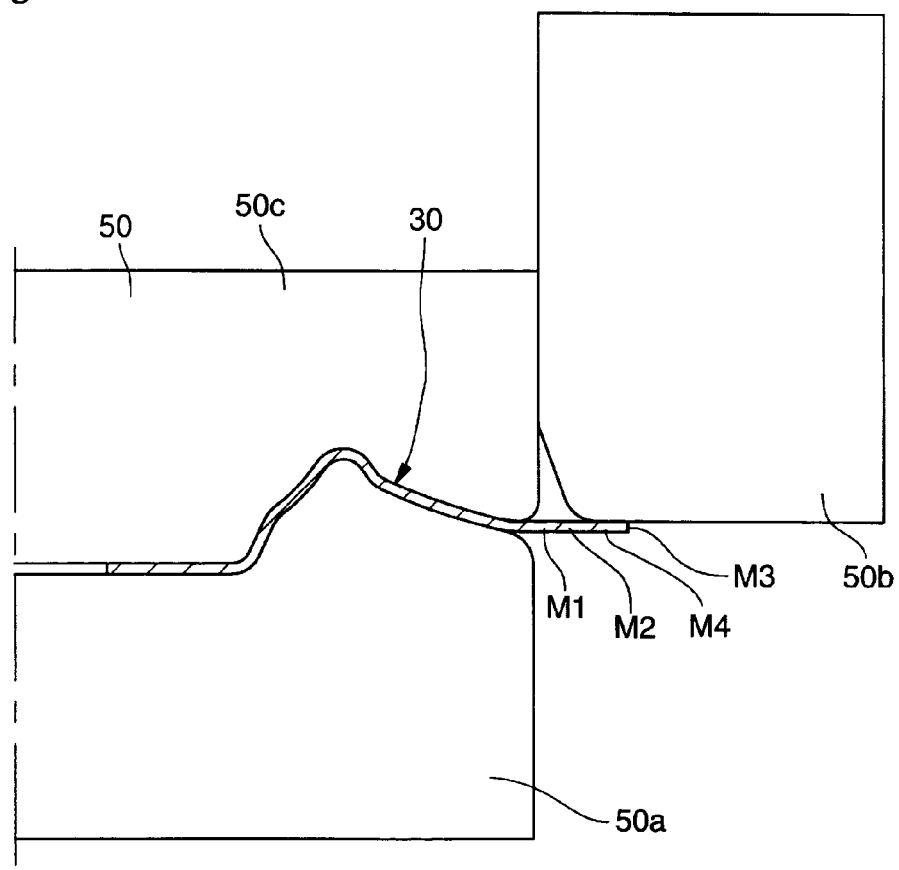
FIG. 5 is a cross-sectional view of an ironing apparatus after a first-dash step and just before the first step used in the manufacturing method of the vehicle wheel disk according to the First Embodiment of the present invention, where a left half of the ironing apparatus is not shown and hatchings of the ironing apparatus are omitted in order to clarify the drawing.
Figure 6:
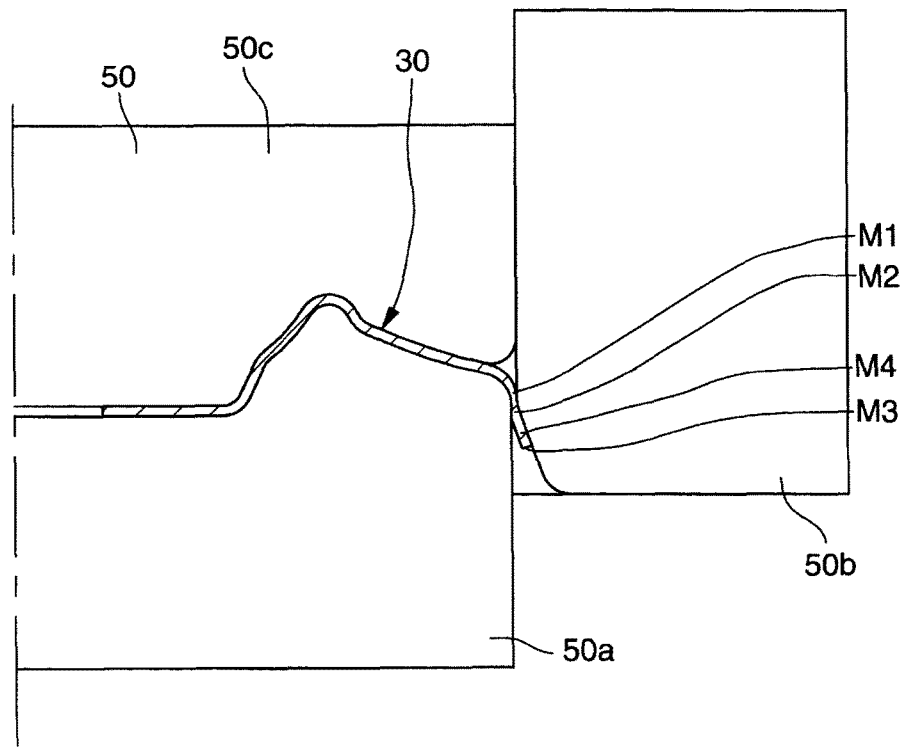
FIG. 6 is a cross-sectional view of the ironing apparatus during the first step used in the manufacturing method of the vehicle wheel disk according to the First Embodiment of the present invention, where a left half of the ironing apparatus is not shown and hatchings of the ironing apparatus are omitted in order to clarify the drawing.
Figure 7:
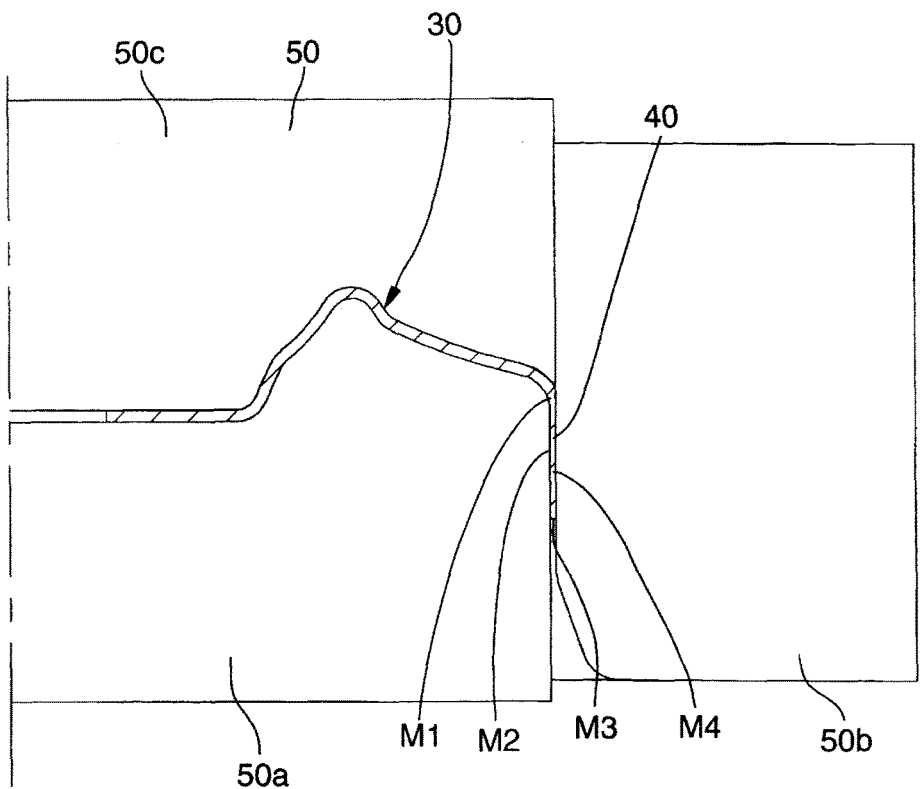
FIG. 7 is a cross-sectional view of the ironing apparatus after the first step used in the manufacturing method of the vehicle wheel disk according to the First Embodiment of the present invention, where a left half of the ironing apparatus is not shown and hatchings of the ironing apparatus are omitted in order to clarify the drawing.
Figure 8:
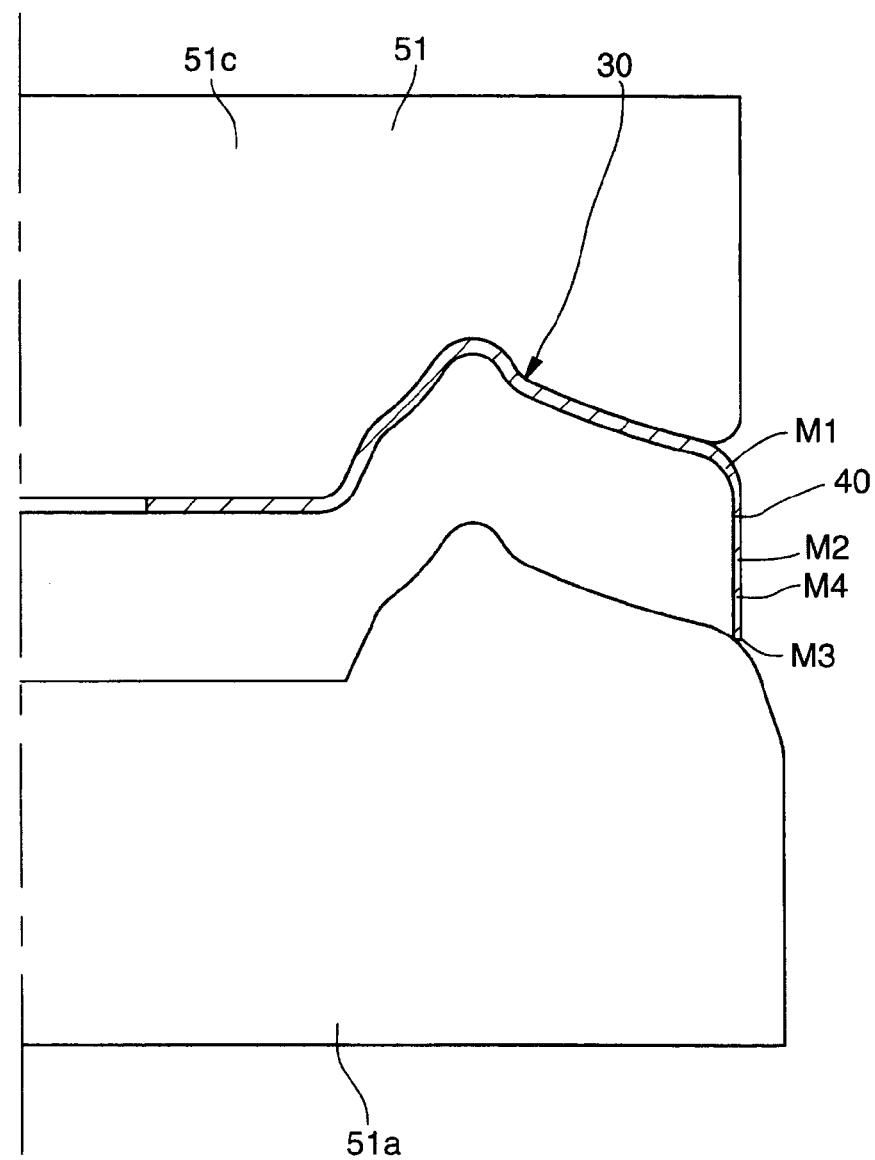
FIG. 8 is a cross-sectional view of a diameter-changing apparatus just before a second step used in the manufacturing method of the vehicle wheel disk according to the First Embodiment of the present invention, where a left half of the diameter-changing apparatus is not shown and hatchings of the diameter-changing apparatus are omitted in order to clarify the drawing.
Figure 9:
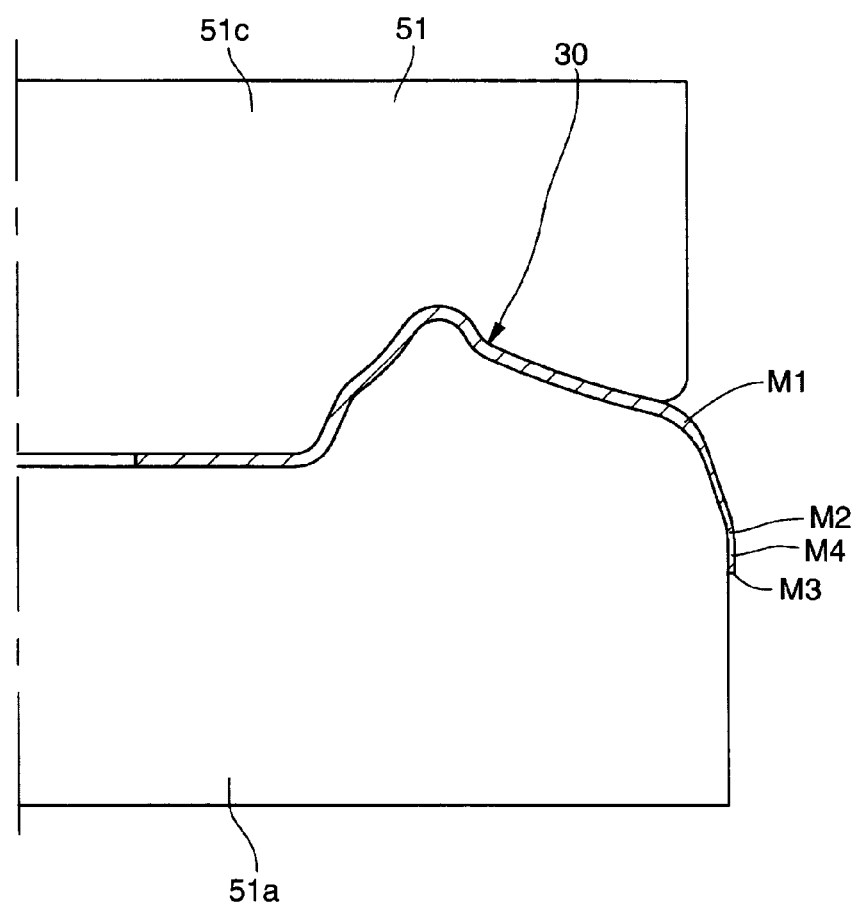
FIG. 9 is a cross-sectional view of the diameter-changing apparatus after the second step used in the manufacturing method of the vehicle wheel disk according to the First Embodiment of the present invention, where a left half of the diameter-changing apparatus is not shown and hatchings of the diameter-changing apparatus are omitted in order to clarify the drawing.

The manufacturing method of the vehicle wheel disk 10 includes:

(i) as illustrated in FIGS. 5-7, a first step (an ironing-drawing step) for ironing a portion or an entirety of the disk material 30 from the first material position M to the second material position M2 to a cylindrical portion 40 having a thickness smaller than the thickness of the disk material before ironing; and (ii) as illustrated in FIGS. 8 and 9, a second step (a diameter-changing step) conducted after the first step, for changing a diameter of at least one of a disk material portion between the second material position M2 and the third material position M3 and a disk material portion at the first material position M1 so that the disk material portion between the second material position M2 and the third material position M3 becomes larger in diameter than the disk material portion at the first material position M1.

At the first step, as illustrated in FIG. 7, an entirety of the disk material from the first material position M1 to the third material position M3 may be ironed. As illustrated in FIG.

10, the manufacturing method of the vehicle wheel disk 10 further includes (iii) a third step (a forming step) conducted after the second step of item (ii) above, for forming the disk material portion between the second material position M2 and the third material position M3 to a final disk flange 13 configuration. In the embodiment and drawings discussed hereinbelow, at the first step of item (i) above, the disk material from the first material position M1 to the fourth material position M4 or from the first material position M1 to the third material position M3 will be ironed.

As to the first step of item (i) above (i-1) At the first step, an entire circumference of the disk material is pressed at the same time. Ironing-drawing may be conducted once or more than once including a replacement of a die.

(i-2) As illustrated in FIGS. 5-7, at the first step, ironing-drawing is conducted by using an ironing apparatus 50 which is a press machine installed a punch 50a, a die 50b and a push pad 50c. Ironing may be conducted after drawing. At the first step, while a portion located radially inside the first material position M1 of the disk material 30 is squeezed between the punch 50a and the pad 50c, the die 50b is moved relative to the punch 50a and the pad 50c only in an axial direction of the disk material 30 (which is the same direction as the axial direction of the disk 10), whereby the disk material is ironed and drawn. Alternatively, the punch 50a and the pad 50c may be moved relative to the die 50b.

(i-3) A side surface opposing the die 50b of the punch 50a is a constant diameter surface (i.e., a constant diameter cylindrical surface) or a convex and concave surface (i.e., an undulated surface, a not constant diameter surface, a not constant diameter cylindrical surface), whereby the thickness of an entire portion of the cylindrical portion 40 except for a thick portion 41 which is described below may be constant (including substantially constant) or not constant.

Figure 12:
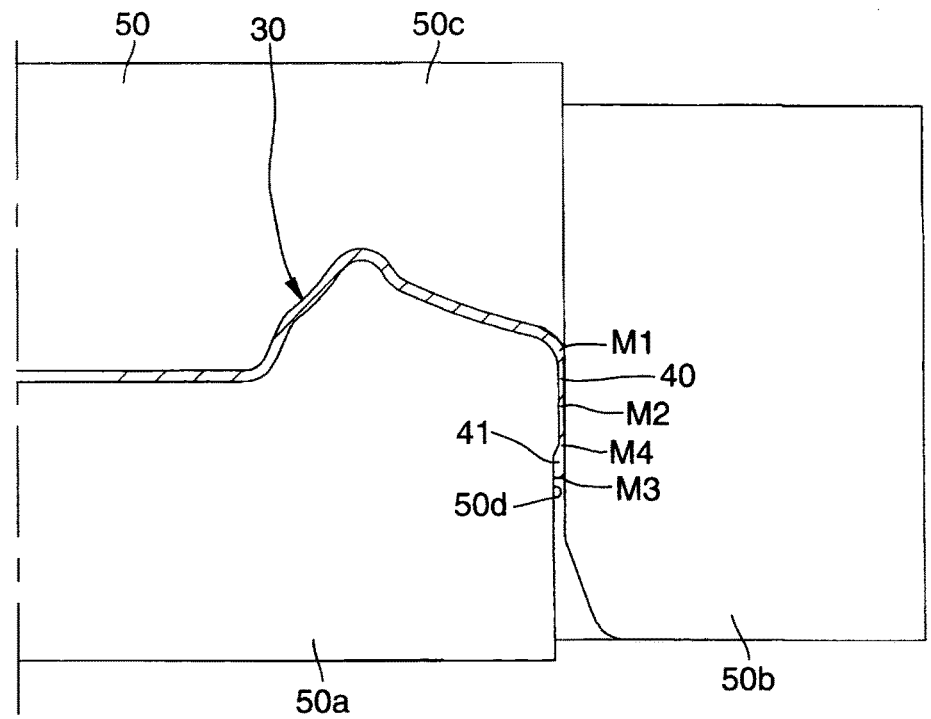
FIG. 12 is a cross-sectional view of an ironing apparatus after a first step used in a manufacturing method of the vehicle wheel disk according to an alteration of the First Embodiment of the present invention, where a left half of the ironing apparatus is not shown and hatchings of the ironing apparatus are omitted in order to clarify the drawing.

As illustrated in FIG. 12, at the first step, the thick portion 41 may be formed at from the fourth material position M4 to the third material position M3. The thick portion 41 is located at an axially inner end of the disk material 30 after the first step. The thick portion 41 is larger in thickness than a disk material portion adjacent to the thick portion 41 in the axial direction of the disk material. The thick portion 41 may be provided at an entire portion of the disk material 30 from the second material position M2 to the third material position M3. In the present invention and the drawings discussed hereinbelow, the thick portion 41 will be provided at a portion of the disk material only between the fourth material position M4 and the third material position M3. The thick portion 41 is provided at in order that a crack is prevented from being generated in the disk material 30 at the second step of item (ii) above (especially, when the second step is a diameter-enlarging step). In a case where the disk 10 includes the thick disk flange portion 13c, the thick portion 41 becomes the thick disk flange portion 13c after the second step of item (ii) above and the third step of item (iii) above. However, as illustrated in FIG. 3c, in a case where the disk 10 does not include the thick disk flange portion 13c, the thick portion 41 is thinned to the same thickness as the disk between the second disk position and the fourth disk position D4 at the third step of item (iii) above.

Figure 14:
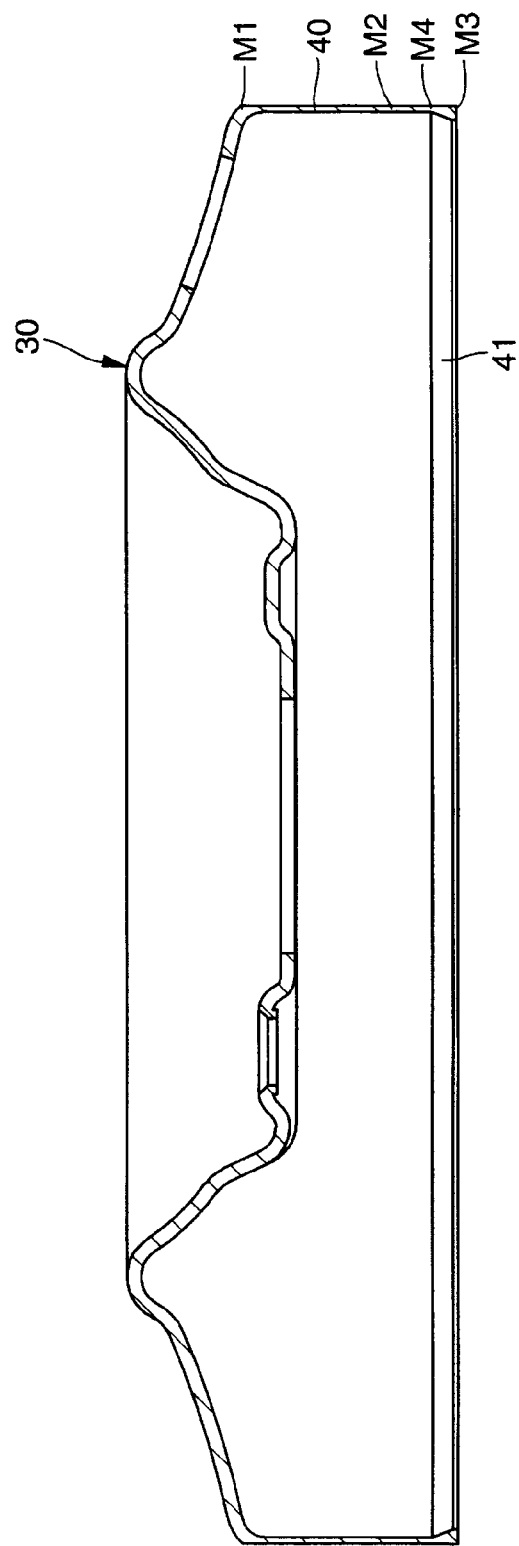
FIG. 14 is a cross-sectional view of a disk material after a first step used in a manufacturing method of the vehicle wheel disk according to an alteration of the First Embodiment of the present invention.
Figure 15:
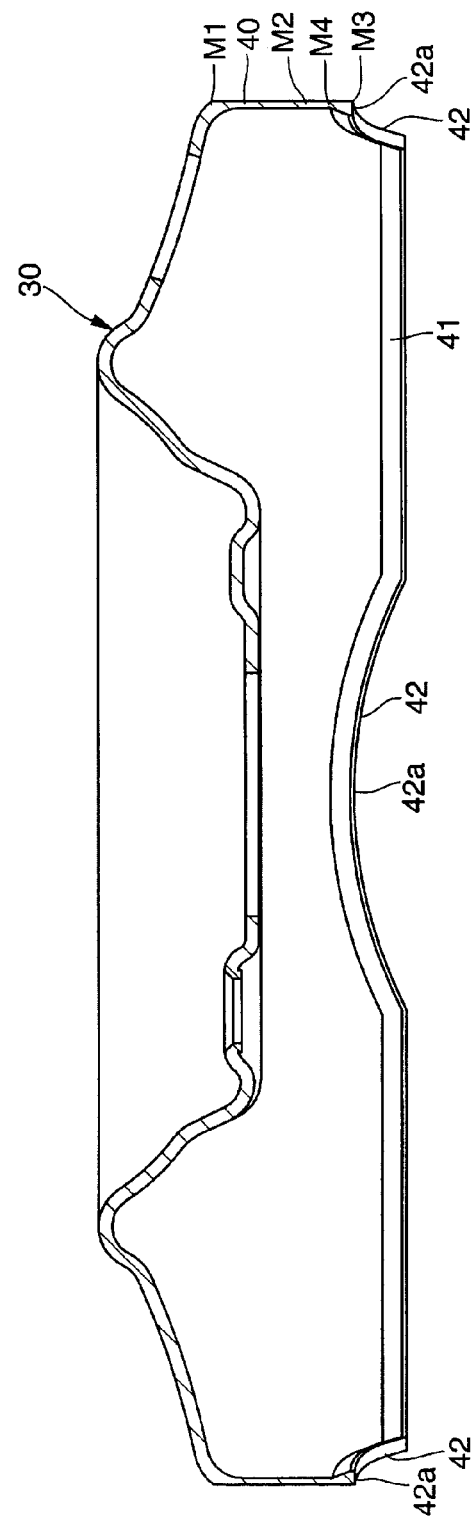
FIG. 15 is a cross-sectional view of a disk material after a first step used in a manufacturing method of the vehicle wheel disk according to an alteration of the First Embodiment of the present invention.
Figure 16:
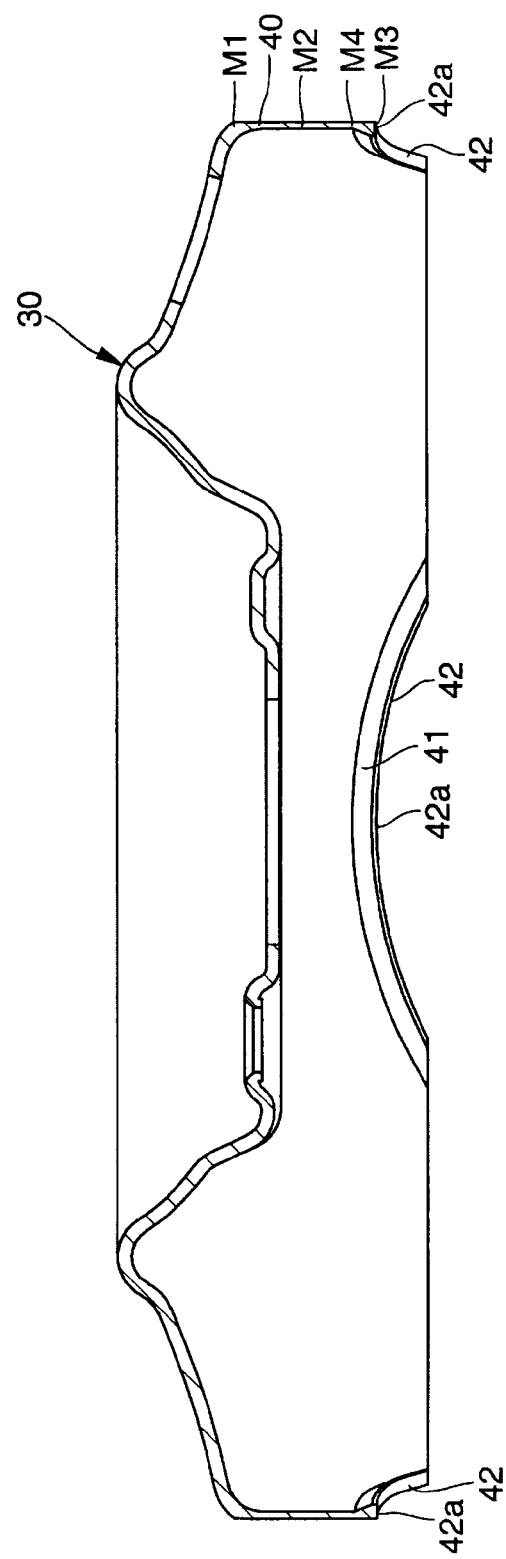
FIG. 16 is a cross-sectional view of a disk material after a first step used in a manufacturing method of the vehicle wheel disk according to an alteration of the First Embodiment of the present invention.
Figure 17:
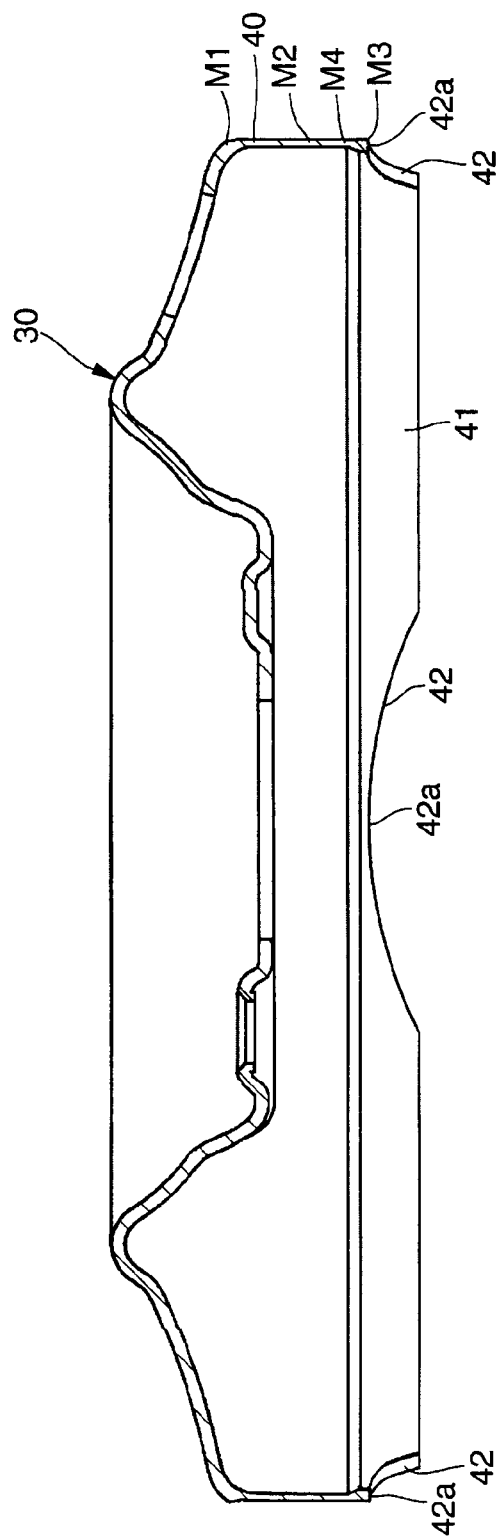
FIG. 17 is a cross-sectional view of a disk material after a first step used in a manufacturing method of the vehicle wheel disk according to an alteration of the First Embodiment of the present invention.

As illustrated in FIG. 3, when the disk 10 manufactured from the disk material 30 does not have the ventilation 13a (shown in FIG. 11 (c)), as illustrated in FIG. 14, the thick portion 41 is provided continuously in the circumferential direction of the cylindrical portion 40 of the disk material 30. As illustrated in FIG. 11, when the disk 10 manufactured from the disk material 30 has the ventilation 13a, as illustrated in FIGS. 15-17, it is preferable that the thick portion 41 is provided at at least a deepest portion 42a of a portion (which will be described hereinafter as a concave portion) 42 formed to the ventilation 13a. This is because, when the second step is the diameter-enlarging step and when a stress is occurred in the cylindrical portion 40 of the disk material, the largest stress is occurred at the deepest portion 42a. FIG. 15 illustrates a case where the thick portion 41 is provided continuously in the circumferential direction of the cylindrical portion 40 including the deepest portion 42a. FIG. 16 illustrates a case where the thick portion 41 is provided at the concave portion 42 including the deepest portion 42a. FIG. 17 illustrates a case where the thick portion 41 is provided at an entire circumference of an axially inward portion of the cylindrical portion including the deepest portion 42a.

The thick portion 41 is, for example, is formed by a method of item (a1) or (a2) below. (a1) As illustrated in FIG. 12, the thick portion 41 is formed by providing a recess 50d to the punch 50a. The recess 50d is provided at the side surface opposing the die 50b of the punch 50a and the recess 50 recedes in a direction away from the die 50b. Since the recess 50d is provided, the thick portion 41 which is protruded inwardly in the radial direction of the disk material 30 can be formed at from the fourth material position M4 to the third material position M3. The thickness of the thick portion 41 may be the same (including substantially the same) thickness as the thickness of the disk material 30 before the first step or may be smaller than the thickness of the disk material 30 before the first step.

Figure 13:
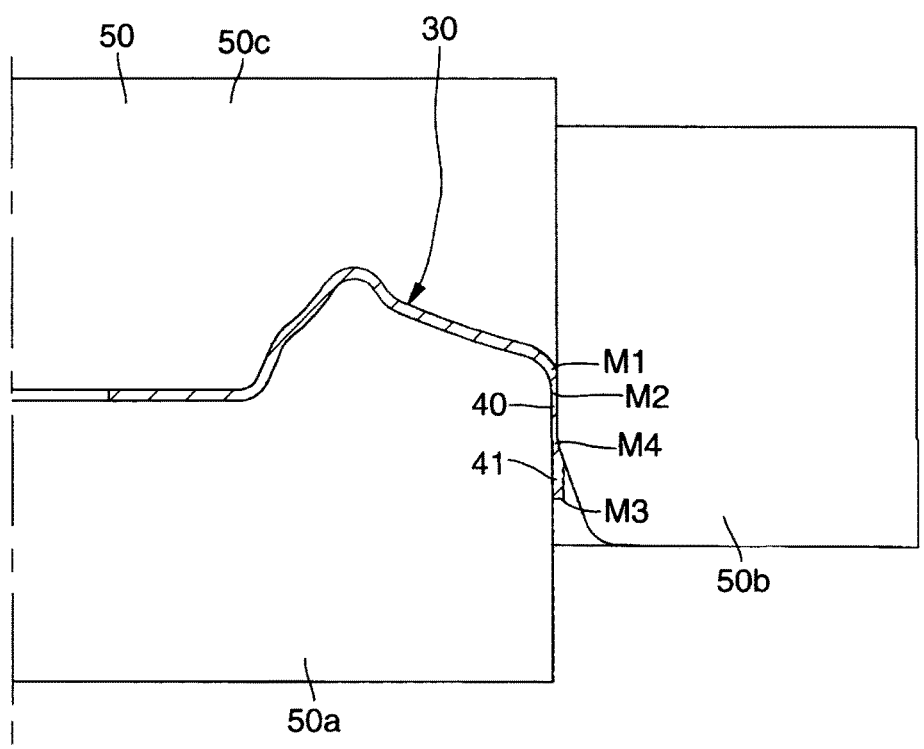
FIG. 13 is a cross-sectional view of an ironing apparatus after a first step used in a manufacturing method of the vehicle wheel disk according to an alteration of the First Embodiment of the present invention, where a left half of the ironing apparatus is not shown and hatchings of the ironing apparatus are omitted in order to clarify the drawing.

(a2) As illustrated in FIG. 13, the thick portion 41 is formed by stopping movement of the die 50b relative to the punch 50a when the die 50b reaches an axially intermediate portion of the cylindrical portion 40 and then drawing out the die 50b from the punch 50a. A portion of the disk material 30 located ahead of the stopping position of the die 50b (i.e., the portion from the fourth material position M4 to the third material position M3 of the disk material 30) is not ironed and is larger than in thickness than the ironed portion of the disk material (i.e., the portion from the first material position M1 to the fourth material position M4 of the disk material 30) in a direction where an outside diameter is larger than the ironed portion of the disk material. The thickness of the thick portion 41 is the same (including substantially the same) thickness as the thickness of the disk material 30 before the first step. In this case, the thick portion 41 which protrudes inwardly in the radial direction of the disk material as illustrated in FIGS. 14-16 protrudes outwardly in the radial direction of the disk material. Alternatively, the thick portion 41 may protrude inwardly and outwardly in the radial direction of the disk material.

In the case where the thick portion 41 is formed by the method of item (a2) above (which is illustrated in FIG. 13), at the first step, the cylindrical portion 40 is formed by ironing from the first material position M1 to the fourth material position M4 of the disk material 30. In a case where the thick portion 41 is not formed or in the case where the thick portion is formed by the method of item (a1) above (which is illustrated in FIG. 12), at the first step, the cylindrical portion 40 is formed by ironing from the first material position M1 to the third material position M3 of the disk material 30.

As to the second step of item (ii) above (ii-1) At the second step, an entire circumference of the disk material is pressed at the same time.

(ii-2) As illustrated in FIGS. 8 and 9, at the second step, both the disk material portion between the second material position M2 and the third material position M3 and the disk material portion between the first material position M1 and the second material position M2 are enlarged in diameter. However, at the second step, the disk material portion between the first material position M1 and the second material position M2 may be shrinked in diameter.

(ii-3) As illustrated in FIG. 8, at the second step, both the disk material portion between the second material position M2 and the third material position M3 and the disk material portion between the first material position M1 and the second material position M2 are enlarged in diameter by using a diameter-changing apparatus 51 which is a press machine installed a punch 51a and a push pad 51c. At the second step, the pad 51c is moved relative to the punch 51a only in the axial direction of the disk material 30 (which is the same direction as the axial direction of the disk 10), whereby both the disk material portion between the second material position M2 and the third material position M3 and the disk material portion between the first material position M1 and the second material position M2 are enlarged in diameter.

(ii-4) At the second step, instead of the pad 51c moving relative to the punch 51a in the axial direction of the disk material 30, the diameter of the disk material 30 may be changed by a divisional die 60 illustrated in FIG. 18 which is moved outwardly in the radial direction of the disk material by a press machine.

As to the second step of item (iii) above (iii-1) At the third step, the disk flange 13 is formed.

(iii-2) At the third step, an entire circumference of the disk material is pressed at the same time.

Figure 10:
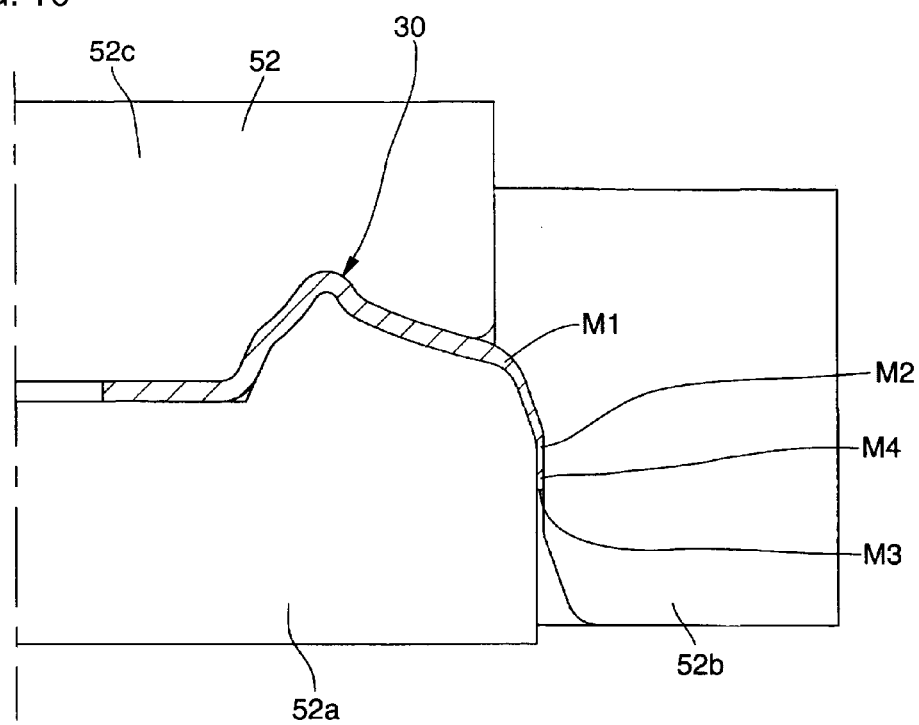
FIG. 10 is a cross-sectional view of a forming apparatus after a third step used in the manufacturing method of the vehicle wheel disk according to the First Embodiment of the present invention, where a left half of the forming apparatus is not shown and hatchings of the forming apparatus are omitted in order to clarify the drawing.

(iii-3) As illustrated in FIG. 10, at the third step, the disk material portion between the second material position M2 and the third material position M3 is formed. The disk material portion between the first material position M1 and the second material position M2 may be also formed.

(iii-4) At the third step, forming is conducted by using a forming apparatus 52 which is a press machine installed a punch 52a, a die 52b and a push pad 52c. At the third step, while the portion located radially inside the first material position M1 of the disk material 30 is squeezed between the punch 52a and the pad 52c, the die 52b is moved relative to the punch 52a and the pad 52c only in the axial direction of the disk material 30 (which is the same direction as the axial direction of the disk 10), whereby the disk material is formed. Alternatively, the punch 52a and the pad 52c may be moved relative to the die 52b.

(iii-5) At the third step, while the disk material 30 between the second material position M2 and the third material position M3 is formed by using the forming apparatus 52, the disk material 30 between the second material position M2 and the third material position M3 may be thinned due to ironing by using the forming apparatus 52. In this case, (a) the disk material portion between the second material position M2 and the third material position M3 may be formed to a constant thickness, (b) the thick disk flange portion 13c which is larger in thickness than the disk material portion between the second material position M2 and the fourth material position M4 may be formed between the fourth material position M4 and the third material position M3 or (c) a thickness at the third material position M3 may be the thinnest from the second material position M2 to the third material position M3.

(iii-6) The third step may be conducted at the same time as the second step, when the diameter of the disk material is changed by the divisional die 60 illustrated in FIG. 18 (the entire circumference of the disk material is formed by an expander at the same time).

(iii-7) The third step may be omitted when a sufficient accuracy is secured at the second step.

Figure 19:
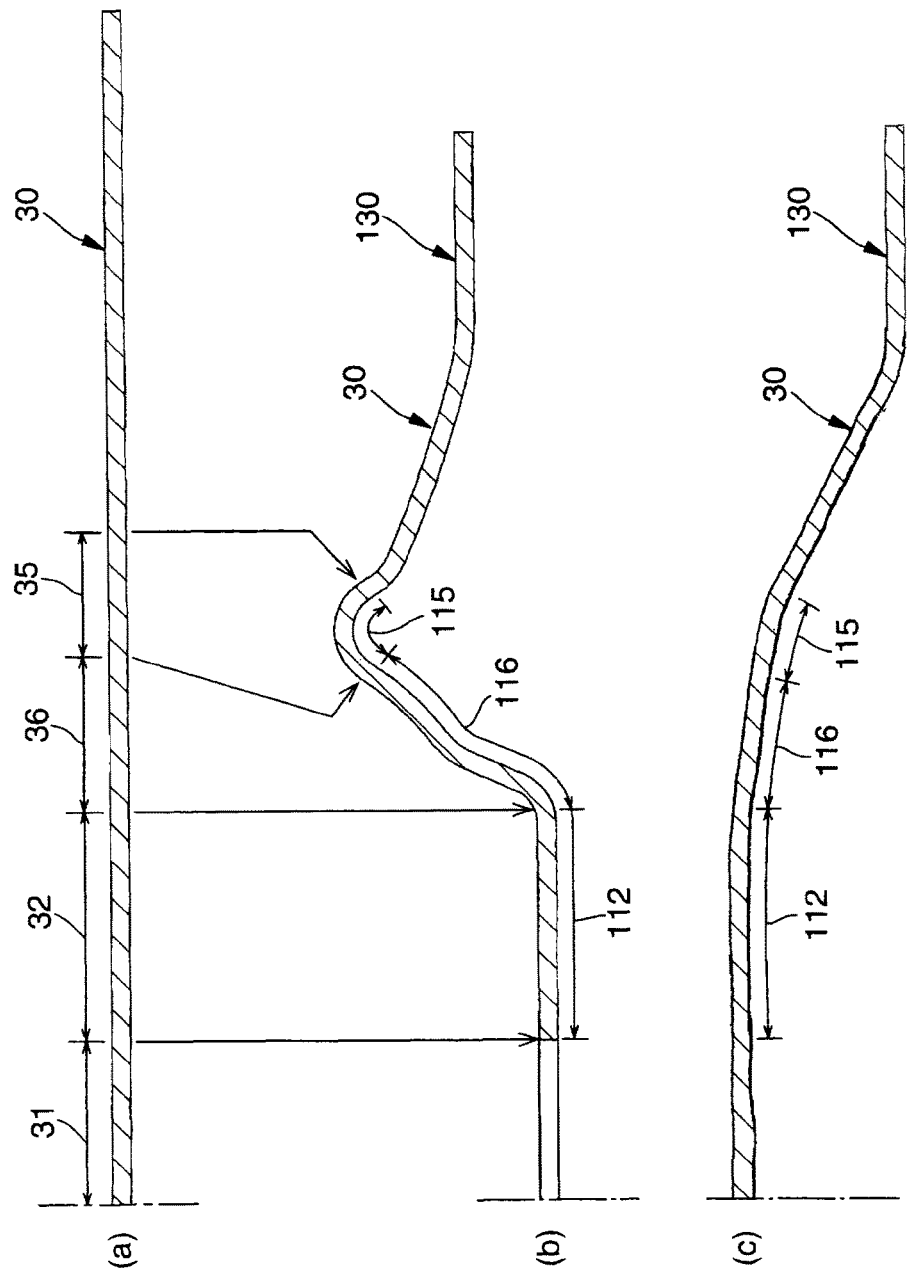
FIG. 19 is a cross-sectional view of the disk material before and after a pre-forming step used in the manufacturing method of the vehicle wheel disk according to the First Embodiment of the present invention, where a left half of the ironing apparatus is not shown,
(a) illustrates the disk material of the flat plate before the pre-forming step,
(b) illustrates the disk material after the pre-forming step, and
(c) illustrates a disk material pre-formed to another configuration.

As illustrated in FIG. 19, in addition to the items (i)-(iii) above, the manufacturing method of the vehicle wheel disk 10 further comprising (i') a first-dash step conducted before the first step, for pre-forming the hub coupling portion-corresponding portion 32, the radially inner hat portion-corresponding portion 36 and the hat top corresponding portion 35 of the disk material 30 as illustrated in FIG. 19 (a) to a hub coupling portion-intermediate corresponding portion 112, a radially inner hat portion-intermediate corresponding portion 116 and a hat top inter mediate corresponding portion 115 of a disk intermediate material 130 (which is one form of the disk material 30), respectively. Alternatively, the first-dash step may be conducted after the third step. The first-dash step may be omitted. The first-dash step is conducted by drawing (the entire circumference of the disk material is pressed at the same time).

The first-dash step may be a step for pre-forming to a hub coupling portion-intermediate corresponding portion 112, a radially inner hat portion-intermediate corresponding portion 116 and a hat top inter mediate corresponding portion 115 of a disk intermediate material 130 (which is a form of the disk material 30) as illustrated ins FIG. 19 (c).

It is preferable that the portion formed to the configuration illustrated in FIG. 19 (b) or FIG. 19 (c) (the portion formed at the first-dash step) may be formed to a final configuration at a fourth step which is different from the first to the third steps.

As to the fourth step above

At the fourth step, the hub coupling portion-intermediate corresponding portion 112, the radially inner hat portion-intermediate corresponding portion 116 and the hat top inter mediate corresponding portion 115 of the disk intermediate material 130 are formed to a final configurations of the hub coupling portion 12, the radially inner hat portion 16 and the hat top 15 of the wheel disk 10, respectively. The fourth step may be conducted before the third step.

Next, (A) technical advantages of the vehicle wheel disk 10 according to the embodiment of the present invention and (B) technical advantages of the manufacturing method of the vehicle wheel disk 10 portions common to all embodiments of the present invention will be explained.

(A) technical advantages of the vehicle wheel disk 10 according to the embodiment of the present invention (A-1) Since the first thickness-reduced portion 18a smaller in thickness than the disk material 30 is formed at the radially outer hat portion 17, the vehicle wheel disk 10 can be effectively and surely lightened.

(A-2) Since the second thickness-reduced portion 18b smaller in thickness than the disk material 30 is formed at the disk flange 13, the thickness-reduced portion 18 is formed not only at the radially outer hat portion 17 but also at the disk flange 13. Therefore, the vehicle wheel disk 10 can be more lightened than a case where the thickness-reduced portion 18 is formed only at the disk flange 13.

(A-3) Since the disk flange 13 includes the thick disk flange portion 13c located at at least an inner end portion of the disk flange 13 in the axial direction of the disk and at least a portion of the disk flange 13 in the circumferential direction of the disk, a rigidity of the vehicle wheel disk 10 can be improved and an assembly accuracy of the disk with the vehicle wheel rim 20 is improved.

(A-4) Since the first thickness-reduced portion 18*a* is formed at the portion of the radially outer hat portion 17 spaced outwardly from the vent window 19 in the radial direction of the disk, a lightening rate of the disk can be increased, keeping a strength of the vehicle wheel disk 10.

(A-5) Since the second thickness-reduced portion 18*b* is provided at the entirety of the disk flange 13 in the axial direction of the disk, the vehicle wheel disk 10 can be lightened compared with a case where the second thickness-reduced portion 18*b* is provided at a portion only of the disk flange 13 in the axial direction of the disk.

(A-6) When the thick disk flange portion 13*c* protrudes radially outward direction of the disk, the contact area between the disk 10 and the rim 20 becomes small, the assembly accuracy between the disk 10 and the rim 20 is improved and the deflection accuracy of the wheel 1 is improved.

(A-7) When the thick disk flange portion 13*c* protrudes radially inward direction of the disk, the rigidity of the disk 10 can be improved. Further, when the disk 10 is assembled with the rim 20, since the thickness of the welding portion of the disk flange 13 with the rim is thick, welding the disk with the rim becomes easy.

(B) technical advantages of the manufacturing method of the vehicle wheel disk 10 portions common to all embodiments of the present invention will first be explained.

(B-1) The method includes the first step for ironing a portion or the entirety of the disk material 30 portion from the first material position M1 to the second material position M2 to the cylindrical portion 40 having the thickness smaller than the thickness of the disk material portion before ironing. Thus, the thickness-reduced portion 18 thinner than the thickness of the disk material 30 before the first step can be formed at the radially outer hat portion 17. As a result, the vehicle wheel disk can be more effectively and more surely lightened than a disk where the thickness-reduced portion 18 is provided only at the disk flange 13. Further, the method includes the second step for changing the diameter of at least one of the disk material portion between the second material position M2 and the third material position M3 and the disk material portion at the first material position M1 so that the disk material portion between the second material position M2 and the third material position M3 becomes larger in diameter than the disk material portion at the first material position M1. As a result, the cylindrical portion which has been formed at the first step can be formed to the disk flange 13 and the radially outer hat portion 17.

(B-2) At the second step, both the disk material portion between the second material position M2 and the third material position M3 and the disk material portion between the first material position M1 and the second material position M2 are enlarged in diameter. As a result, forming the disk material is more easily conducted than in a case where at least one of the disk material 30 portion between the second material position M2 and the third material position M3 and the disk material 30 portion between the first material position M1 and the second material position M2 is shrinked in diameter.

(B-3) At the first step, a portion or the entirety of the disk material 30 portion from the first material position M1 to the second material position M2 is ironed, and the disk material portion from the second material position M2 to the fourth material position M4 or from the second material position M2 to the third material position M3 is also ironed. Thus, the thickness-reduced portion 18 thinner than the thick material before the first step can be formed at not only the radially outer hat portion 17 but also the disk flange 13. Thus, the vehicle wheel disk 10 can be more effectively and more surely lightened than in a case where the thickness-reduced portion is formed at the disk flange only.

(B-4) At the first step, at least the disk material 30 portion between the third material position M3 and the fourth material position M4 is formed to the thick portion 41 larger in thickness than the disk material portion adjacent to the thick portion 41 or the first thickness-reduced portion 18*a*. As a result, a crack is prevented from being generated in the disk at the second step (especially, when the second step is a diameter-enlarging step).

(B-5) After the second step, the third step is provided for forming the disk material portion between the second material position M2 and the third material position M3 to the final disk flange configuration. As a result, the disk flange 13 can be accurately formed to the final disk flange configuration.

(B-6) At the third step, at least a portion of the disk material portion from the second material position M2 to the fourth material position M4 or from the second material position M2 to the third material position M3 is ironed. As a result, the vehicle wheel disk 10 can be lightened as well as the disk flange 13 can be formed accurately.

(B-7) The method further comprises the step (the step of item (i') above) conducted before the first step, for pre-forming the hub coupling portion-corresponding portion 32, the radially inner hat portion-corresponding portion 36 and the hat top corresponding portion 35 of the disk material 30. As a result, a forming trouble such as a thickness reduction of the radially inner hat portion 16 and the hub coupling portion 12 which may happen if the pre-forming is conducted after the first step (after the third step, etc.) can be prevented from happening.

Next, portions unique to respective embodiments of the manufacturing method of the vehicle wheel disk 10 of the present invention will be explained.

[First Embodiment of the Manufacturing Method] (FIGS. 3-19)

In the first embodiment, the following unique portions are constructed:

(a) As illustrated in FIG. 7, the thickness of the cylindrical portion 40 (except for the thick portion 41) formed at the first step is substantially constant. A space (minimum space) between the punch 50*a* and the die 50*b* of the ironing apparatus 50 is narrower than the thickness of the disk material 30 before the first step.

(b) As illustrated in FIG. 10, at the third step, at least a portion of the disk material 30 from the second material position M2 to the third material position M3 is thinned due to ironing by using the forming apparatus 52. A space (minimum space) between the punch 52*a* and the die 52*b* of the forming apparatus 52 is narrower than the thickness of the thickest portion of the disk flange from the second material portion M2 to the third material position M3 after the second step. The space (minimum space) between the punch 52*a* and the die 52*b* of the forming apparatus 52 is narrower than the thickness of the thinnest portion of the disk flange from the second material position M2 to the third material position M3 after the second step.

At the first step, the thick portion 41 is formed at between the fourth material position M4 and the third material position M3, and at the third step, the disk material is ironed so that the thick portion is larger in thickness than a disk material portion adjacent to the thick portion, whereby the disk 10 including the thick disk flange portion 13c can be formed.

The first embodiment of the present invention has the following unique effect: At the third step, the disk material 30 between the second material position M2 and the third material position M3 is ironed. Thus, the disk flange 13 of the vehicle wheel disk 10 can be formed accurately compared with a case where the disk material 30 between the second material position M2 and the third material position M3 is not ironed.

[Second Embodiment of the Manufacturing Method] (FIG. 20)

In the second embodiment, the following unique portions are constructed:

(a) At the third step, both the disk material 30 between the second material position M2 and the third material position M3 and the disk material 30 between the first material position M1 and the second material position M2 are squeezed and not ironed.

At the first step, the thick portion 41 is formed at between the fourth material position M4 and the third material position M3, and at the third step, the thickness of the thick portion 41 is not changed, whereby the disk 10 including the thick disk flange portion 13c can be formed.

The second embodiment of the present invention has the following unique effect: At the third step, the disk material 30 between the second material position M2 and the third material position M3 is not ironed. Thus, since a processing condition is not severe, a die cost can be low compared with a case where the disk material 30 between the second material position M2 and the third material position M3 is ironed.

[Third Embodiment of the Manufacturing Method] (FIG. 21)

In the third embodiment, the following unique portions are constructed:

(a) As illustrated in FIG. 21, the thickness of the cylindrical portion 40 (except for the thick portion 41) formed at the first step is composed of two kinds of thickness. A stepped portion (including a tapered portion) 50e is provided at the side surface opposing the die 50b of the punch 51a, whereby the thickness of the cylindrical portion 40 is composed of two kinds of thickness. A plurality of stepped portions 50e is provided, whereby the thickness of the cylindrical portion 40 may be composed of two kinds of thickness. In case of FIG. 21, the disk material 30 between the second material position M2 and the third material position M3 is smaller in thickness than the disk material between the first material position M1 and the second material position M2. A space (minimum space) between the punch portion 50f located at outside the stepped portion 50e in the axial direction of the disk material and the die 50b is narrower than the thickness of the disk material 30 before the first step. A space (minimum space) between the punch portion 50g located at inside the stepped portion 50e in the axial direction of the disk material and the die 50b is narrower than the space (minimum space) between the punch portion 50f and the die 50b. However, the disk material 30 between the second material position M2 and the third material position M3 may be larger in thickness than the disk material between the first material position M1 and the second material position M2. In this case, the space (minimum space) between the punch portion 50g located at inside the stepped portion 50g in the axial direction of the disk material and the die 50b may be narrower than the thickness of the disk material 30 before the first step, may be larger than the thickness of the disk material 30 before the first step or as the same thickness as the disk material 30 before the first step. Further, the space (minimum space) between the punch portion 50g located at inside the stepped portion 50g in the axial direction of the disk material and the die 50b is larger than the space (minimum space) between the punch portion 50f located at outside the stepped portion 50e in the axial direction of the disk material and the die 50b. The space (minimum space) between the punch portion 50f located at outside the stepped portion 50e in the axial direction of the disk material and the die 50b is narrower than the thickness of the disk material 30 before the first step. The stepped portion 50e may be located at between the first material position M1 and the second material position M2 or between the second material position M2 and the third material position M3 in the axial direction of the disk material.

(b) At the third step, the disk material portion between the second material position M2 and the third material position M3 and the disk material portion between the first material position M1 and the second disk material position M2 are formed by using the forming apparatus 52. At the third step, the disk material 30 is not ironed. However, the disk material 30 may be ironed.

The third embodiment of the present invention has the following unique effect: The thickness of the portion ironed at the first step is composed of two kinds of thickness. Thus, the vehicle wheel disk 10 manufactured from a plate having both strength and lightening can be manufactured, compared with a case where the thickness of the portion ironed at the first step is composed of one kind of thickness only.

[Fourth Embodiment of the Manufacturing Method] (FIGS. 22 and 23)

In the fourth embodiment, the following unique portions are constructed:

(a) An outside diameter of the cylindrical portion 40 formed at the first step is substantially the same as the outside diameter of the vehicle wheel disk 10.

(b) At the second step, the disk material portion between the first material position M1 and the second material position M2 is shrinked in diameter by using the diameter-changing apparatus 51.

The fourth embodiment of the present invention has the following unique effect:

At the second step, neither the disk material 30 between the second material position M2 and the third material position M3 nor the disk material 30 between the first material position M1 and the second material position M2 is enlarged in diameter. Therefore, since the portion ironed at the first step is not enlarged at the second step, a crack is prevented from being generated in the disk at the second step, compared with a case where both the disk material 30 between the second material position M2 and the third material position M3 and the disk material 30 between the first material position M1 and the second material position M2 are enlarged in diameter.

EXPLANATION OF REFERENCE NUMERALS 1 wheel
2 flat plate
10 vehicle wheel disk
11 hub hole
12 hub coupling portion
12b rib 13 disk flange
13a ventilation
13b general axial end
13c thick disk flange portion
14 hat
15 hat top
15a top point
15b radially inner curved portion
15c radially outer curved portion
16 radially inner hat portion
17 radially outer hat portion
18 thickness-reduced portion
18a first thickness-reduced portion
18b second thickness-reduced portion
19 vent window
20 rim
21 inboard flange
22 inboard bead seat
23 inboard side wall
24 drop
25 outboard side wall
26 outboard bead seat
27 outboard flange
30 disk material
31 hub hole corresponding portion
32 hub coupling portion-corresponding portion
33 disk flange corresponding portion
34 hat corresponding portion
35 hat top corresponding portion
36 radially inner hat portion-corresponding portion
37 radially outer hat portion-corresponding portion
39 vent window corresponding portion
40 cylindrical portion
41 thick portion
D1 first disk position
D2 second disk position
D3 third disk position
D4 fourth disk position
M1 first material position
M2 second material position
M3 third material position
M4 fourth material position

The invention claimed is:

1. A manufacturing method of a vehicle wheel disk for manufacturing a wheel disk for a vehicle from a disk material,
wherein the wheel disk comprises:
a hat including a hat top, a radially outer hat portion and a radially inner hat portion;
a disk flange;
a first disk position (D1) located outer than the hat top in a radial direction of the disk and inner than the disk flange in the radial direction of the disk;
a second disk position (D2) located at a boundary between the radially outer hat portion and the disk flange;
a third disk position (D3) located at an inner end of the disk flange in an axial direction of the disk; and
a fourth disk position (D4) located inner than the second disk position (D2) in the axial direction of the disk and outer than the third disk position (D3) in the axial direction of the disk,
the disk flange extending straight in the axial direction of the disk in a cross section taken along a radially extending plane of the disk,
wherein before the disk material is formed to the wheel disk, the disk material includes:
a first material position (M1),
a second material position (M2),
a third material position (M3), and
a fourth material position (M4) which are brought to the first disk position (D1), the second disk position (D2), the third disk position (D3) and the fourth disk position (D4), respectively, after the disk material has been formed to the wheel disk,
the method comprising:
a first step for ironing a portion or an entirety of a disk material portion from M1 to M2 to a cylindrical portion having a thickness smaller than a thickness of the disk material portion before ironing; and
a second step for changing a diameter of at least one of a disk material portion between M2 and M3 and a disk material portion at M1 so that the disk material portion between M2 and M3 becomes larger in diameter than the disk material portion at M1.

2. A manufacturing method of a vehicle wheel disk according to claim 1, wherein at the second step, both the disk material portion between M2 and M3 and the disk material portion between M1 and M2 are enlarged in diameter.

3. A manufacturing method of a vehicle wheel disk according to claim 1, wherein at the first step, a disk material portion from M2 to M4 or from M2 to M3 is also ironed.

4. A manufacturing method of a vehicle wheel disk according to claim 3, wherein at the first step, at least a disk material portion between M3 and M4 is formed to a thick portion larger in thickness than a disk material portion adjacent to the thick portion or a first thickness-reduced portion which is formed at the radially outer hat portion and is smaller in thickness than the disk material.

5. A manufacturing method of a vehicle wheel disk according to claim 1, further comprising a third step conducted after the second step, for forming the disk material portion between M2 and M3 to a final disk flange configuration.

6. A manufacturing method of a vehicle wheel disk according to claim 5, wherein at the third step, at least a portion of the disk material portion from M2 to M4 or from M2 to M3 is ironed.

7. A manufacturing method of a vehicle wheel disk according to claim 1, wherein
the wheel disk includes a hub coupling portion, and
the disk material includes a hub coupling portion-corresponding portion and a hat corresponding portion, the hat corresponding portion including a hat top corresponding portion, a radially outer hat portion-corresponding portion and a radially inner hat portion-corresponding portion,
the manufacturing method of a vehicle further comprising a step conducted before the first step, for pre-forming the hub coupling portion-corresponding portion, the radially inner hat portion-corresponding portion and the hat top corresponding portion of the disk material.

* * * * *

UNITED STATES PATENT AND TRADEMARK OFFICE
CERTIFICATE OF CORRECTION

| | | |
|---|---|---|
| PATENT NO. | : 9,511,623 B2 | Page 1 of 1 |
| APPLICATION NO. | : 14/378225 | |
| DATED | : December 6, 2016 | |
| INVENTOR(S) | : K. Abe et al. | |

It is certified that error appears in the above-identified patent and that said Letters Patent is hereby corrected as shown below:

In the Specification

At Column 1, Line 10, change "Mar. 2, 2012" to -- Mar. 12, 2012 --.

At Column 14, Line 51, change "position M" to -- position M1 --.

Signed and Sealed this
Sixth Day of June, 2017

Michelle K. Lee
*Director of the United States Patent and Trademark Office*